(12) United States Patent
Palsson et al.

(10) Patent No.: US 6,450,820 B1
(45) Date of Patent: Sep. 17, 2002

(54) METHOD AND APPARATUS FOR ENCOURAGING PHYSIOLOGICAL SELF-REGULATION THROUGH MODULATION OF AN OPERATOR'S CONTROL INPUT TO A VIDEO GAME OR TRAINING SIMULATOR

(75) Inventors: Olafur S. Palsson, Chesapeake; Randall L. Harris, Sr., Seaford; Alan T. Pope, Poquoson, all of VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 9 days.

(21) Appl. No.: 09/612,412

(22) Filed: Jul. 3, 2000

Related U.S. Application Data

(60) Provisional application No. 60/143,028, filed on Jul. 9, 1999.

(51) Int. Cl.[7] .......................... G09B 19/00; A63F 13/00
(52) U.S. Cl. .................. 434/236; 434/238; 463/36; 463/37; 463/38
(58) Field of Search ......................... 434/29, 236, 237, 434/238, 307 R, 322, 323, 362; 345/952; 463/23, 36, 37, 38, 39

(56) References Cited

U.S. PATENT DOCUMENTS

| | | |
|---|---|---|
| 4,008,714 A | 2/1977 | Silva et al. |
| 4,358,118 A | 11/1982 | Plapp |
| 4,461,301 A | 7/1984 | Ochs |
| 4,630,817 A | 12/1986 | Buckley |
| 4,683,891 A | 8/1987 | Cornellier et al. |
| 4,751,641 A | 6/1988 | Silva et al. |
| 4,812,126 A | 3/1989 | Gilliksen |
| 5,001,632 A | 3/1991 | Hall-Tipping |
| 5,163,690 A | 11/1992 | Davis et al. |
| 5,362,049 A | 11/1994 | Hofer |
| 5,362,069 A | 11/1994 | Hall-Toipping |
| 5,377,100 A | 12/1994 | Pope et al. |
| 5,474,082 A | 12/1995 | Junker |
| 5,553,864 A * | 9/1996 | Sitrick |
| 5,601,435 A | 2/1997 | Quy |
| 5,662,117 A | 9/1997 | Bittman |
| 5,676,138 A | 10/1997 | Zawilinski |
| 5,720,619 A | 2/1998 | Fisslinger |
| 5,740,812 A | 4/1998 | Cowan |
| 5,772,508 A | 6/1998 | Sugita et al. |
| 5,860,935 A | 1/1999 | Blaszynski et al. |
| 5,911,581 A | 6/1999 | Reynolds et al. |
| 5,974,262 A | 10/1999 | Fuller et al. |
| 5,983,129 A | 11/1999 | Cowan et al. |
| 5,990,866 A * | 11/1999 | Yollin |
| 6,001,065 A | 12/1999 | DeVito |
| 6,012,926 A * | 1/2000 | Hodges et al. |
| 6,024,700 A * | 2/2000 | Nemirovski et al. |
| 6,026,322 A * | 2/2000 | Korenman et al. |
| 6,057,846 A | 5/2000 | Sever, Jr. |

* cited by examiner

Primary Examiner—John Edmund Rovnak
(74) Attorney, Agent, or Firm—Helen M. Galus

(57) ABSTRACT

Apparatus and methods for modulating the control authority (i.e., control function) of a computer simulation or game input device (e.g., joystick, button control) using physiological information so as to affect the user's ability to impact or control the simulation or game with the input device. One aspect is to use the present invention, along with a computer simulation or game, to affect physiological state or physiological self-regulation according to some programmed criterion (e.g., increase, decrease, or maintain) in order to perform better at the game task. When the affected physiological state or physiological self-regulation is the target of self-regulation or biofeedback training, the simulation or game play reinforces therapeutic changes in the physiological signal(s).

90 Claims, 16 Drawing Sheets

FIGURE 2C.

Terminate-and-Stay-Resident Software Module that Implements Flow Chart in Figure 2A

```
;* JOY.ASM - A simple memory-resident program that adjust the
;* joystick inputs based upon physiological signals which come
;* into Joystick, 2 port.  The TSR program intercepts the requests
;* for joystick inputs and modifies it based upon the
;* physiological signals.  It terminates through
;* the Terminate-and-Stay-Resident function (function 31h).
;*
;* Version 1.5 reads the joystick position and save that as MidX
;* & Y If it finds the program already in memory then it first
;* restores the old interrupt vector and then removes the NewJoy
;* function and then exits also.
;* Joystick position 2 is used to scale the outputs of Joystick
;* position 0 and 1.
;* Version 2.0 uses the Joystick position 3 to determine if the
;* button presses will be passed on to the game.  A low count
;* will turn off the button presses.
;* Version 3.0 is used to get int 15 ah = 84 & CX = 2
;* from MS Flight Simulator 3.0 and
;* descramble their positions and scale positions based upon
;* physiological data clear their button presses if needed.
;* Version 3.1 includes the Calibration of the mid point of the
;* joystick and zero physiological signals in the joystick buffer
;* area of the FS3 software
;* Version 3.2 includes the Calibration of the physiological
;* signals performed by Randy and Alan on June 20, 1997
;* Minimum physiological voltage will be set to 3.3 volts and the
;* count value for zero will be 1678h
;* Version 3.21 zeros out button presses if physiological signal
;* is below 4 volts, 16e0h counts
;* Version 3.22 adjusts for the count offset in location 9fe5 in
;* the main flight simulator program
;*
;* Written by Randall L. Harris, Sr.  May 1, 1997
;*           Updated July 1, 1997

;.386
        .MODEL tiny              ; Create JOY.COM
            .STACK

.CODE
```

```
            ORG     5dh                 ; Location of first argument of the
                                        ; command line in PSP
Arg1 LABEL          WORD
            ORG     6dh                 ; Location of second argument of the
                                        ;command line in PSP
Arg2 LABEL          WORD ORG     100h                ; Start of Program
        .STARTUP
            jmp     Install             ; Jump over data and resident code ; Data must be in code segment so it won't be thrown away with
; Install code.

JoyID           byte        "JOYv3.22"      ; Idenfier of this
                                            ;program
OldJoy          DWORD       ?               ; Address of original joystick
;                                           ; routine
MidX        word        0               ; Middle joystick position
MidY        word        0               ; Middle joystick position
Mcxcount        word        0           ; CX count used to get MidY & MidX
ADMidX          word        0               ; value of MidX - Mcxcount +
                                            ;cxcount(9fe5)
ADMidY          word        0               ; value of MidY - Mcxcount +
                                            ; cxcount(9fe5)
ADPhys          word        0               ; value of cxcount(9fe5) - 0f8
Scale           word        0c8h            ; Scale to divide, max value of
                                            ; physiological signal
Calibrate       byte        0               ; -1 if have values for MidX & MidY
tempjoy         equ         0a013h
joypos          equ         09fe7h
button          equ         09fe4h
;* NewJoy - Handler routine for Joystick (cassette) interrupt
; (interrupt 15).

NewJoy PROC     FAR
        cli                             ; Make sure maskable interrupts are
stopped
        cmp     ah,84h                  ; see if joystick interrupt
        je      funct
joyint:     jmp     cs:OldJoy           ; No, then far-calling original
                                        ; routine
funct:  cmp     dx,02h                  ; New joystick read from FS
        jne     joyint                  ; if function is not 2 then call
                                        ; oldjoy
funct2: mov     si,1ch                  ; Function 02 must be call from FS
sort1:      mov     ax,ds:[si+tempjoy]  ; Sort joystick positions
        or      ax,ax                   ; test if equal
        je      sort5                   ; jump if equal
        mov     bx,joypos               ; get address of joystick position
```

FIG. 2C Continued

```
        mov     cx,si                   ; move count to cx
        sar     cx,1h                   ; divide by 2 = 14 first time
sort2:  sar     cx,1h                   ; divide by 2 = 7 first time
        jb      sort3                   ; jump if negative
        mov     bp,ds:[bx]              ; but address in bp
        or      bp,bp                   ; check for zero value
        jne     sort4                   ; must not be zero
        mov     ds:[bx],ax              ; Save non zero value
        jmp     sort4                   ;
sort3:  mov     word ptr ds:[bx],0h     ; Set to zero
sort4:  add     bx,02h                  ; Increment to next temp
                                        ; storage
        cmp     bx,joypos+8             ; Finished with positions yet?
        jb      sort2                   ; No, try some more
sort5:  sub     si,2h                   ; Decrement SI and try some more
        jns     sort1                   ; Keep going until si < 0
        mov     bx,joypos               ; NOW WORK WITH physiological
        mov     cx,ds:[bx+6]            ; get physiological signal
        add     cx,0f8h                 ; adjust physiological value
        sub     cx,ds:[bx-2]            ; zero based upon cxcount
        mov     al,cs:Calibrate         ; see if MidX & MidY are defined
        or      al,al                   ; Set flags
        jnz     physio
        mov     ax,ds:[bx]              ; Get X of joystick
        mov     cs:MidX,ax
        mov     ax,ds:[bx+2]            ; Get Y of joystick
        mov     cs:MidY,ax
        mov     ax,ds:[bx-2]            ; Get cxcount
        mov     cs:Mcxcount,ax
        mov     al,0ffh
        mov     cs:Calibrate,al
physio: mov     ax,cs:MidX
        add     ax,ds:[bx-2]
        sub     ax,cs:Mcxcount
        mov     cs:ADMidX,ax
        mov     ax,ds:[bx]
        mov     ax,cs:MidY
        add     ax,ds:[bx-2]
        sub     ax,cs:Mcxcount
        mov     cs:ADMidY,ax
        mov     ax,ds:[bx]              ; Start scaling
        cmp     ax,cs:ADMidX
        jb      negX
        sub     ax,cs:ADMidX
        mul     cx                      ; multiply by physiological
        div     word ptr cs:Scale       ; divide by Scale value
        add     ax,cs:ADMidX            ; add X midpoint into AX
        jmp     doY
negX:   sub     ax,cs:ADMidX
        neg     ax
```

FIG. 2C Continued

```
            mul   cx                       ; multiply by physiological
            div   word ptr cs:Scale        ; divide by Scale value
            neg   ax
            add   ax,cs:ADMidX
    doY:    mov   ds:[bx],ax               ; Save scaled X joystick
            mov   ax,ds:[bx+2]             ; Get Y joystick
            cmp   ax,cs:ADMidY
            jb    negY
            sub   ax,cs:ADMidY             ; subtract Y midpoint from BX
            mul   cx                       ; multiply by physiological
            div   word ptr cs:Scale        ; divide by Scale value
            add   ax,cs:ADMidY             ; add Y midpoint into BX
            jmp   doexit
    negY:   sub   ax,cs:ADMidY
            neg   ax
            mul   cx                       ; multiply by physiological
            div   word ptr cs:Scale        ; divide by Scale value
            neg   ax
            add   ax,cs:ADMidY
    doexit: mov   ds:[bx+2],ax             ; Save Y joystick
            mov   ax,ds:[bx-2]             ; Get cxcount
            sub   ax,ds:[bx+4]             ; Get second physiological to
            xor   cx,cx                    ; Zero a register
            mov   ds:[bx+4],cx             ; Zero physiological signals
            mov   ds:[bx+6],cx
            cmp   ax,90h                   ; determine if buttons should be
            jb    endint                   ; ignored
            mov   bx,button
            mov   ds:[bx],cl               ; Yes, Zero out buttons
    endint: iret                           ; Return from interrupt handler NewJoy  ENDP ;*  Install - Replaces the old interrupt handler with
;*  NewJoy as the interrupt handler for the joystick, then makes
;*  program memory resident by exiting through function 31h.
;*
;*  This procedure marks the end of the TSR's resident section and
;*  the beginning of the installation section.  When JOY
;*  terminates through function 31h, the above code and data
;*  remain resident in memory.  The memory occupied by the
;*  following code is returned to DOS.

Install PROC

; Read joystick inputs
```

FIG. 2C Continued

```
; and store in MidX and MidY.

push  ds
        push  cs
        pop   ds
        mov   ax, 3515h         ; Request function 35h
        int   21h               ; Get vector for timer (interrupt 15)
        mov   WORD PTR OldJoy[0], bx    ; Store address of original
        mov   WORD PTR OldJoy[2], es    ; timer interrupt
        sub   bx,bx
        .REPEAT                 ; See if Joy has already been
                                ; loaded
        mov   al, BYTE PTR JoyID[bx]    ; Test for same "Name"
        cmp   BYTE PTR es:JoyID[bx], al
        jne   noinst
        inc   bx
        .UNTIL (bx == 8)
        push  ds
        mov   ax, WORD PTR es:OldJoy[2] ; Restore original interrupt
                                        ; service
        push  ax
        pop   ds
        mov   ax, 2515h         ; Request function 25h
        mov   dx, WORD PTR es:OldJoy[0] ; DS:DX points to new timer
                                        ; handler
        int   21h               ; Set vector with address of NewTimer
        pop   ds
        mov   ah, 49h
        int   21h               ; Release Joy TSR memory in program
                                ; block
        .if   !carry?           ; No error
        mov   es,es:[2ch]       ; es = address of environment
        mov   ah, 49h
        int   21h               ; Release Joy TSR memory in environment
                                ; block
        .if   !carry?           ; No error
        sub   ax,ax
        .endif
        .endif
        pop   ds
        mov   ah, 4ch           ; Terminate with saving error
        int   21h
; End of Program release of memory
;
; Setup of program to Terminate and Stay Resident
noinst: mov   ax, 3515h ; Request function 35h
        int   21h               ; Get vector for timer (interrupt 15)
        mov   WORD PTR OldJoy[0], bx   ; Store address of original
        mov   WORD PTR OldJoy[2], es   ; timer interrupt
        mov   ax, 2515h         ; Request function 25h
```

FIG. 2C Continued

```
        mov   dx, OFFSET NewJoy    ; DS:DX points to new timer
                                   ; handler
        int   21h          ; Set vector with address of NewTimer
        pop   ds mov   dx, OFFSET Install   ; DX = bytes in resident section
        mov   cl, 4
        shr   dx, cl       ; Convert to number of paragraphs
        inc   dx           ;    plus one
        mov   ax, 3100h    ; Request function 31h, error code=0
        int   21h          ; Terminate-and-Stay-Resident Offset_err:
        mov   ah, 4ch
        int   21h Install ENDP

END
```

FIG. 2C Continued

METHOD AND APPARATUS FOR ENCOURAGING PHYSIOLOGICAL SELF-REGULATION THROUGH MODULATION OF AN OPERATOR'S CONTROL INPUT TO A VIDEO GAME OR TRAINING SIMULATOR

CROSS-REFERENCE

Pursuant to 35 U.S.C. §119, the benefit of priority from provisional application No. 60/143,028, with filing date of Jul. 9, 1999, is claimed for this non-provisional application.

ORIGIN OF THE INVENTION

The invention described herein was jointly made by employees of the United States Government and by an employee of the Eastern Virginia Medical School.

BACKGROUND OF THE INVENTION

1. Field of the Invention

The present invention relates generally to the use of biofeedback to modify a subject's behavior, mental state, and/or physiological functioning. More specifically, the invention relates to apparatus and methods for modulating an operator's control input to an electronic game or simulator in response to measured physiological activity, such as autonomically-mediated and/or EEG physiological activity, wherein the player thereby learns to control the physiological and/or EEG activity.

2. Discussion of Background Art

Biofeedback systems can be used for a variety of purposes, such as to address behavioral disorders, such as Attention Deficit Disorder, and for training job-related physiological activity.

Attention Deficit Disorder (ADD) is a behavioral disorder which is characterized by the inability to sustain attention long enough to perform some activities, such as school work or organized play. Current treatments for ADD include medication, behavior therapy and brainwave biofeedback training. In biofeedback training, the trainee, usually a child, is typically provided information in the form of a conventionally produced electroencephalograph (EEG) display which shows him how much he is producing the brainwave pattern(s) indicative of attention and/or inattention. This display is typically in bland, minimally motivating formats, and trains individuals by focusing their attention directly on the status of targeted physiological signals. For example, this feedback frequently consists of a video representation of the EEG graph. The procedure, though providing useful information, is often very limited in variability and predictable, and accordingly can induce boredom. This can lead to frustration when progress is slow, and makes it hard to encourage simultaneous desirable changes in multiple physiological parameters due to limitations in ability to attend to multiple signals. Positive reinforcement of attention states can accordingly be difficult to obtain, especially in children, and more especially in children exhibiting ADD.

Additionally, with increased sophistication in technology, human performance has increasingly become an important, frequently limiting, factor in the proper performance of many advanced technology job-related tasks. For example, both inattention and stress overload can play a substantial role in impairing pilot performance and producing flight hazards. Current biofeedback methods are hard to apply to job-related physiological training because the necessary focus on physiological feedback signals can distract trainees from challenging professional tasks. The ability to control physiological activity, such as to control stress or to remain aware of fluctuating attentional states, the ability to maintain effective physiological states, and the ability to recover efficiently from attention lapses or other ineffective physiological states are valuable in task settings requiring recognition and response.

U.S. Pat. No. 4,008,714 to Silva et al. Describes a system which generates an audible indication and starts a prerecorded educational program upon determination that the subject has a sufficient concentration level.

U.S. Pat. No. 4,461,301 to Ochs discloses a biofeedback system which provides a visual display of a metric indication of a physiological function and a visual display of a target metric which is readjusted to prevent attainment of the target.

U.S. Pat. No. 5,377,100 entitled "Method of Encouraging Attention by Correlating Video Game Difficulty with Attention Level" demonstrates the concept of improving attention skill by rewarding specific brain signal patterns with success at playing an action video game. The game is virtually impossible to win until the player exhibits the required brain signal patterns that accompany normal vs. attention-deficit behavior. Once the player exhibits the required "normal" brain signal patterns the game becomes manageable. A measurement system senses EEG signals and routes them to the computer where the game difficulty control signal is derived. This invention has the disadvantage of requiring extensive reprogramming of a video game, or the complete construction of a new video game, in order to implement the method. Because much video game software is proprietary and/or not available in source code, this software would be unusable for implementing the method.

A commercial product, entitled "The Mind Drive," senses physiological signals from a finger sensor and uses the signals alone to drive a video game. Because "The Mind Drive" does not deliver biofeedback training while the trainee is playing a game or performing a task in a conventional way, its method does not reinforce desirable physiological changes in the realistic context of task performance. The Mind Drive, too, has the disadvantage of requiring extensive video game programming in order to implement the method.

OBJECTS OF THE INVENTION

It is accordingly an object of the present invention to provide a method and apparatus that provides positive reinforcement of desirable attention states and/or physiological changes or states.

It is another object of the invention to maintain the desirable attention states and/or physiological states once they are obtained in a subject.

It is an object of the present invention to provide a method and apparatus that improves a subject's subsequent ability to both achieve and maintain desirable attention states and/or physiological states, and improves the subject's performance or behavior when conducting his or her daily activities.

It is an object of the invention to provide a video or computer game or training simulation that responds to physiological activity as well as joystick, game pad input and/or other user input.

It is another object of the invention to provide a video or computer game or training simulation system that does not require extensive reprogramming, or complete construction of, the game's or training simulation's software.

Still another object of the present invention is to provide a method and apparatus that delivers biofeedback training while the trainee is playing a game or performing a task in a conventional way, and therefore its method reinforces desirable physiological changes in the realistic context of task performance, with successful performance of the task as intrinsic reinforcement.

It is an object of the present invention to provide apparatus and methods which can be used with off-the-shelf video or personal computer games or existing simulators.

Still another object of the present invention is to provide a method and apparatus that delivers biofeedback training which can help reduce the occurrence of ineffective physiological states, such as inattention and/or dysfunctional stress.

It is another object of the invention to provide a video game or training simulation system that provides engaging entertainment and/or challenges to the user.

Yet another object of the invention is to teach the trainee to incorporate autonomic or EEG (brainwave) physiological self-regulation into professional task performance through repeated associations (classical conditioning) without need for conscious attention to such regulation.

Other objects and advantages of the present invention will become more obvious from the specification and drawings.

SUMMARY OF THE INVENTION

The objects referenced above, and others made obvious herein, can be accomplished by the present invention which provides a video game, simulator, or another task challenge format, which can motivate trainees to participate in and adhere to the training process through the rewards inherent in mastery of popular video games, computer game, or job task simulators, and preferably without the demand, monotony or frustration potential of direct concentration on physiological signals. The present invention includes apparatus and methods modulating the control function of a computer simulation or game input device (e.g., joystick, button control) using physiological information so as to affect the user's ability to impact or control the simulation or game with the input device (control authority). One aspect of the invention is to use the present invention, along with a computer simulation or game, to affect physiological state or physiological self-regulation according to some programmed criterion (e.g., increase, decrease, or maintain) in order to perform better at the game task. When the affected physiological state or physiological self-regulation is the target of self-regulation or biofeedback training, the game play reinforces therapeutic changes in the physiological signal(s). The feedback preferably is, however, implicit in the task and not explicit in the form of direct feedback (e.g., bar graphs, tracings, etc.), and therefore offers more subtle conditioning of the desired physiological response(s) than conventional biofeedback methods and apparatuses. For example, when the present invention is used for training job-related physiological activity it can allow biofeedback training to occur without distracting the trainee from challenging professional tasks, and can teach the trainee to incorporate autonomic or EEG (brainwave) physiological self-regulation into professional task performance through repeated associations (classical conditioning) without need for conscious attention to such regulation.

BRIEF DESCRIPTION OF THE DRAWINGS

Embodiments of the present invention will be described in more detail below, with reference to the following figures, in which:

FIG. 2C shows one embodiment of source code for a TSR software module that can be used to implement the flow chart in FIG. 2A.

DETAILED DESCRIPTION OF THE INVENTION

The present invention includes a method of transforming physiological information obtained from biomedical instruments in order to use that information to modify the functioning of computer simulation or game controllers or joysticks. The invention involves modulation that transforms the controller signals received at the computer's game port prior to their being used by the computer simulation or game software. The result can be that the magnitude of the effect of the game or simulation's input device (e.g., joystick, game pad, steering wheel) is modulated by the strength of the physiological signal(s). By making the joystick's "control authority" proportional to the physiological signal(s), the player is encouraged to change the physiological signal (s) according to a programmed criterion (e.g., increase, decrease, or maintain) in order to perform better at the game task. When the physiological signal(s) are the target of physiological self-regulation or biofeedback training, the game play reinforces therapeutic changes in related physiological processes. However, the reinforcing feedback is preferably implicit in the task, and not explicit in the form of direct feedback (bar graphs, tracings), as in conventional biofeedback training. In this way, contingencies for subtle conditioning of the desirable physiological response(s) are set up.

Different embodiments of the present invention are possible, and the components of the invention can vary depending upon implementation. Further, the invention is intended to be used with a variety of systems, such as standard video game systems (e.g., Sony Playstation, Nintendo, etc.), with standard personal computer systems, and with computer simulators and professional job training systems. Additionally, one or more of a wide variety of different measured physiological signals can be used in accordance with the present invention, for example, EEGs, skin temperature, skin conductance, heart rate, and/or event-related potentials (ERPs). U.S. Pat. No. 5,377,100, issued on Dec. 27, 1994 to Pope et al, and which is incorporated herein by reference as if set forth in its entirety, at column 3, line 8 to column 5, line 60, details a method for determining an individual's EEG index of attention, which index can be used to assess his or her mental engagement in a task.

Figure 1:
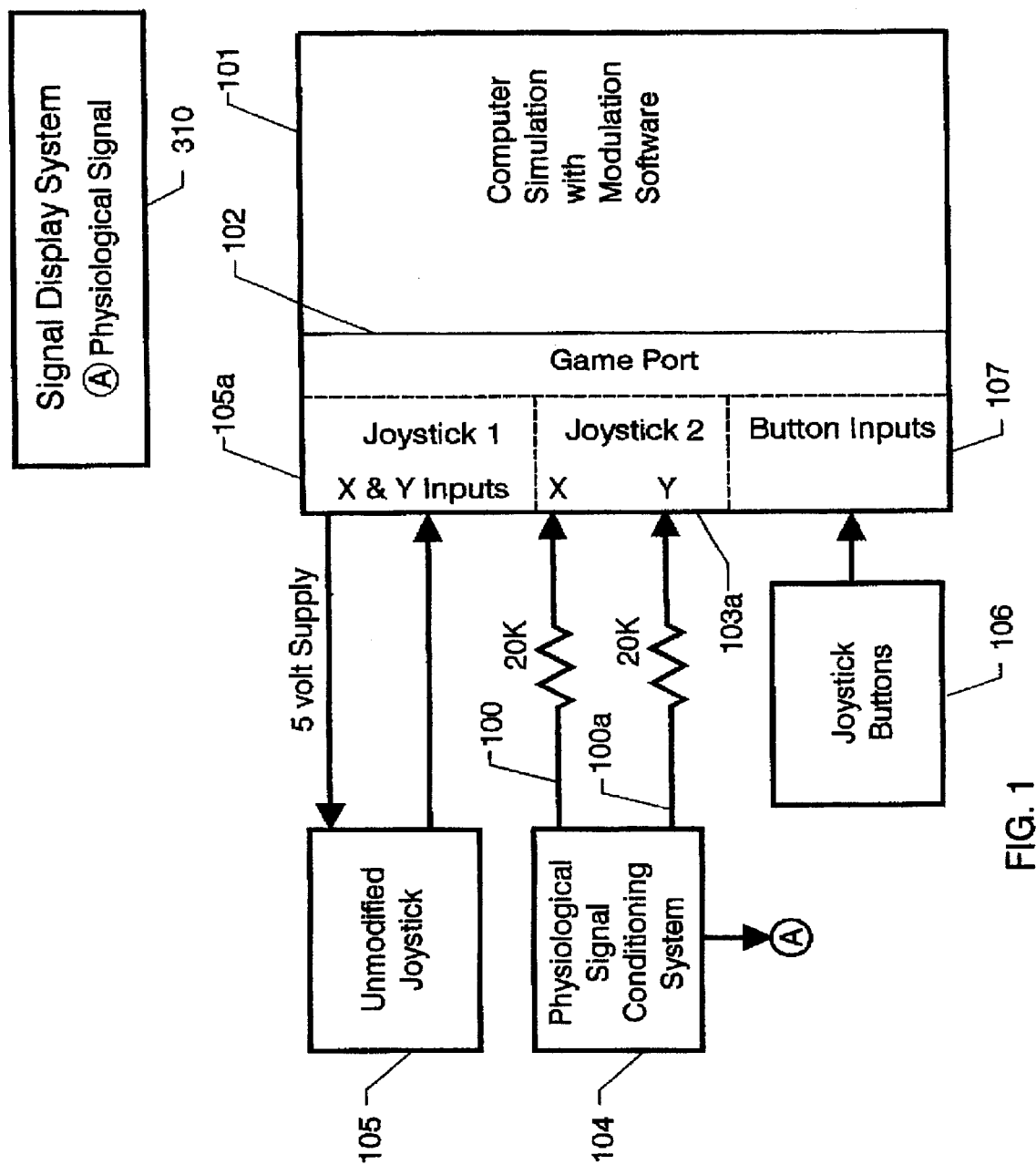
FIG. 1 is a block diagram of an embodiment for a system for the modulation of an operator's control input to a video game or training simulator according to the present invention.

FIG. 1 depicts one preferred embodiment, a "software/hardware combination" implementation, wherein the user's joystick 105 is connected to the primary joystick port 105a and the physiological signals are passed to the secondary joystick port 103a of a multi-port joystick interface. Joystick "counts" can be acquired by both interfaces 103a, 105a by existing computer software. Additional software is added to modulate the primary joystick counts by the secondary physiological signal counts according to some predetermined algorithm.

As shown in FIG. 1, the physiological signal(s) 100, 100a are connected to the computer game port 102 through the terminals 103a designed for the input(s) of a second joystick, but used for the modulating signal(s) 100, 100a in this embodiment of the invention. The game port charging circuit for each joystick axis is designed to cause the joystick-reading software to register a count proportional to the resistance connected to the circuit and inversely proportional to the voltage applied to the circuit. In conventional operation, this resistance is proportional to the position of the joystick in each axis and the applied voltage is supplied as a constant value from the game port. In accordance with at least one embodiment of the present invention, this situation is reversed: the resistance is set to a constant (for example, 20 kilohms) and the applied voltage is made to vary inversely with the physiological signal within the range of approximately 3.2 volts to approximately 5 volts. The count(s) for the input(s) ordinarily connected to joystick 2, registered by the joystick-reading software, is then proportional to the magnitude of the physiological signal(s).

The value of the physiological signal(s) obtained in this way can then be used to modify the count registered from joystick 1 105 in the following manner.

Figure 2A:
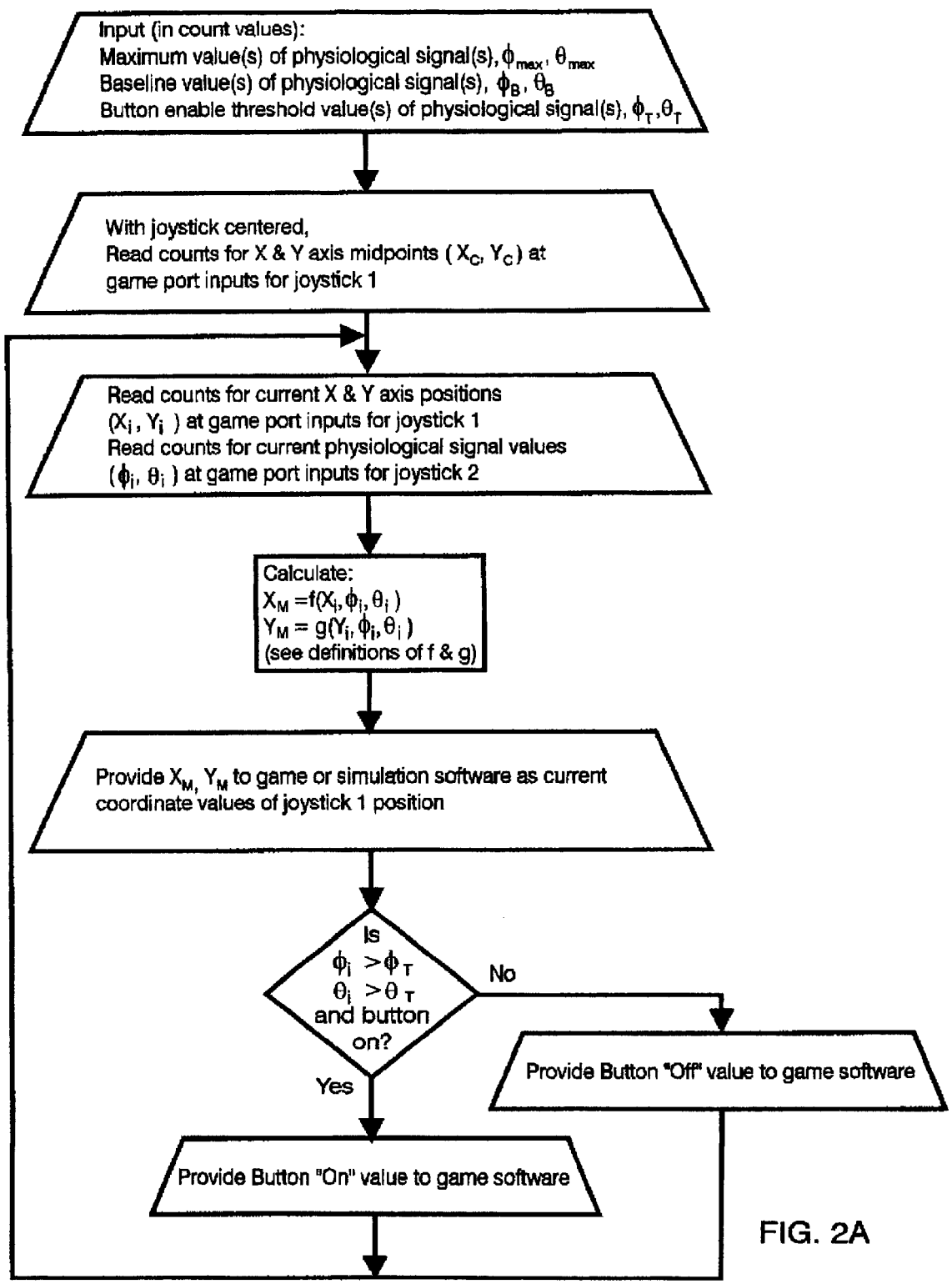
FIG. 2A is a flow chart of a possible embodiment of terminate and stay resident (TSR) software which may be used in accordance with at least one embodiment of the present invention.
Figure 2B:
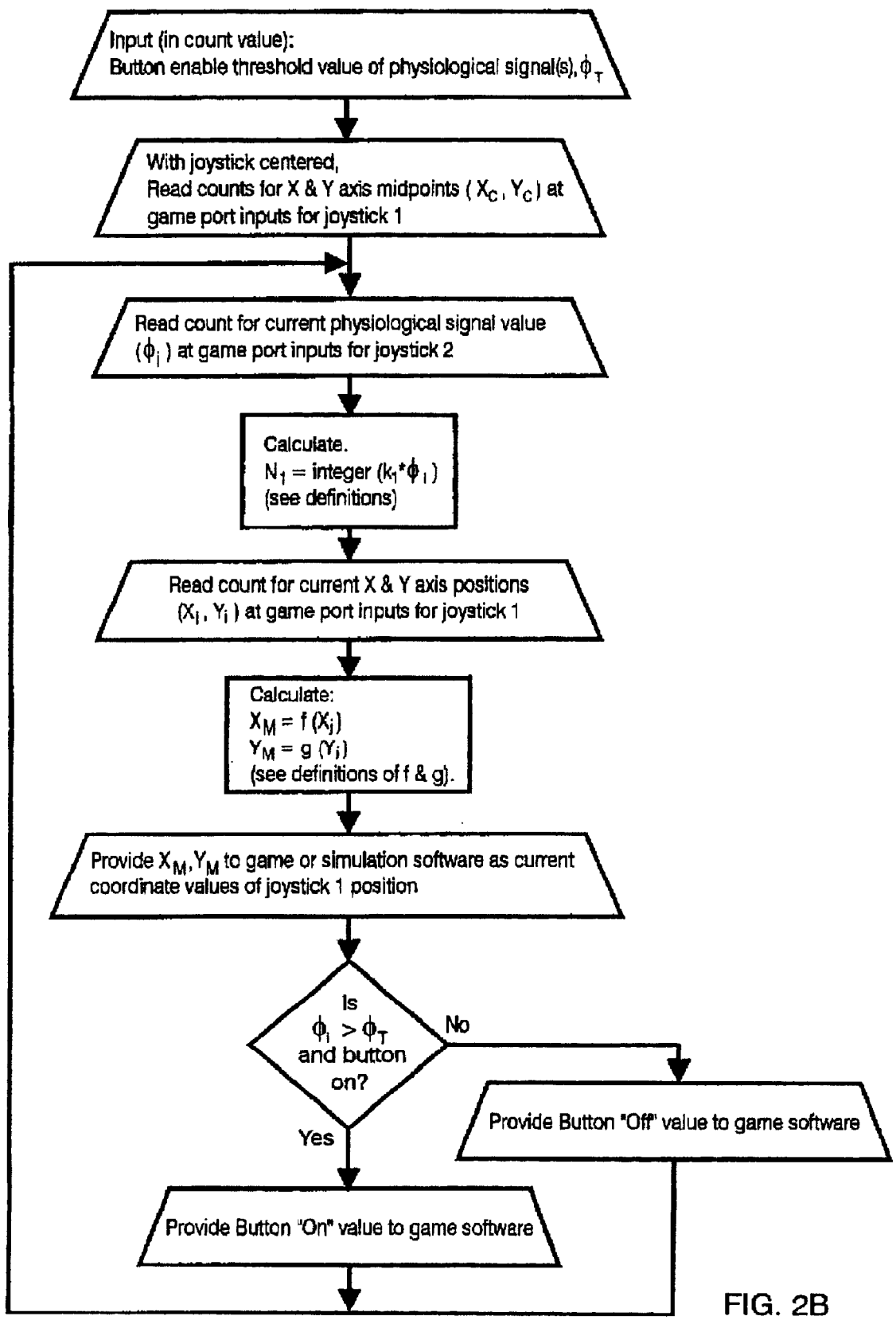
FIG. 2B is a flow chart of another possible embodiment of TSR software which may be used in accordance with at least one embodiment of the present invention.

The following operations can be performed by a terminate-and-stay-resident (TSR) software module that processes the joystick input prior to its being used by the game program. FIGS. 2A and 2B show example flow charts of TSR software modules. FIG. 2A shows a TSR software module that can modulate joystick input with the physiological signal(s) 100, 100a prior to the input being used by the game or simulation program. FIG. 2B shows another possible TSR module wherein the module time averages the joystick input, based on the physiological signal, or signals, prior to input being used by the game or simulation program. FIG. 2C shows one embodiment of source code for a TSR software module that can be used to implement the flow chart in FIG. 2A.

The definitions of terms in FIGS. 2A and 2B include the following. The functions, $f(X_i,\phi_i,\theta_i)$, and $g(Y_i,\phi_i,\theta_i)$, can take several forms, depending upon which embodiment of the present invention is being implemented. The two axes of joystick 2 (corresponding to the x and y inputs 103a) allow for two independent physiological signal inputs ($\phi,\theta$) to be applied to modulate joystick 1 105 position variables (X,Y; $X_c,Y_c$=center position) singly (see equation sets A and B immediately below) or in some combinations of the signals (equation set C below) or to both axes simultaneously (example: equation set A below) or to each axis independently (example: equation set A1 below) or each signal to a different axis (example: equation set A2 below).

Equation set A (modulating with $\phi_i$):

$$f(X_i,\phi_i,\theta_i)=(X_i-X_C)*(\phi_i/\phi_{max})+X_C$$

$$g(Y_i,\phi_i,\theta_i)=(Y_i-Y_C)*(\phi_i/\phi_{max})+Y_C$$

Equation set A1 (modulating the X axis independently with $\phi_i$):

$$f(X_i,\phi_i,\theta_i)=(X_i-X_C)*(\phi_i/\phi_{max})+X_C$$

$$g(Y_i,\phi_i,\theta_i)=Y_i$$

Equation set A2 (modulating with each physiological signal to a different axis):

$$f(X_i,\phi_i,\theta_i)=(X_i-X_C)*(\phi_i/\phi_{max})+X_C$$

$$g(Y_i,\phi_i,\theta_i)=(Y_i-Y_C)*(\theta_i/\theta_{max})+Y_C$$

Equation set B (modulating with $\theta_i$):

$$f(X_i,\phi_i,\theta_i)=(X_i-X_C)*(\theta_i/\theta_{max})+X_C$$

$$g(Y_i,\phi_i,\theta_i)=(Y_i-Y_C)*(\theta_i/\theta_{max})+Y_C$$

Equation set C (modulating with a combination function of $\phi_i$ and $\theta_i$, $h(\phi_i,\theta_i)$):

$$f(X_i,\phi_i,\theta_i)=(X_i-X_C)*h(\phi_i,\theta_i)/h(\phi_{max},\theta_{max})+X_C$$

$$g(Y_i,\phi_i,\theta_i)=(Y_i-Y_C)*h(\phi_i,\theta_i)/h(\phi_{max},\theta_{max})+Y_C$$

In another possible embodiment of the present invention, instead of using the current count of the physiological signal to multiply the stick position by, the current count may be used as an index of how many stick position readings to average to get a filtered count number (e.g., a joystick response "sluggishness" modulation):

$N_1$=integer($k_1*\phi_i$), where $k_1$ is a constant that scales the influence of the physiological signal on sluggishness.

$$f(X_j) = (1/N_1)\sum_{j=1}^{N_1} X_j$$

$$g(Y_j) = (1/N_1)\sum_{j=1}^{N_1} Y_j$$

The signal that modulates the functionality of the joystick 1 105 does not have to be a monotonic function of the physiological signal, but can, for example, represent the deviation of the subject's physiological signal from a baseline level. This procedure differs from those described above essentially only in that the magnitude of the effect of the game controller or joystick 1 on the game or simulation is modulated by the magnitude of the difference between the physiological signal(s) being input at the joystick 2 input(s) and a baseline value ($\phi_B$) provided to the software by the operator:

Equation set D:

$$f(X_i,\phi_i,\theta_i)=(X_i-X_C)*\text{absolute value }[(\phi_i-\phi_B)/(\phi_{max}-\phi_B)]$$

$$g(Y_i,\phi_i,\theta_i)=(Y_i-Y_C)*\text{absolute value }[(\phi_i-\phi_B)/(\phi_{max}-\phi_B)]$$

The count corresponding to the midpoint of each axis excursion of joystick 1 105 is determined when the game starts ($X_C,Y_C$).

In at least one embodiment, during game play, the counts corresponding to the current x and y position ($X_i,Y_i$) of joystick 1 105 are then captured and the midpoint counts of each axis are subtracted from this value. The resulting signed difference in each axis is then multiplied by a value equal to the current count value of the physiological signal (s) divided by the number of counts in the full range of the physiological signal(s). This signed multiplication result is then added back to the midpoint count in the respective axis and this count value in each axis is provided to the game program as the current value of the joystick 1 input.

The result is that the magnitude of the effect of the game controller or joystick 1 105 on the game or simulation is modulated by the strength of the physiological signal(s) 100, 100a being input at the joystick 2 input(s) 103a.

A software patch can be applied to the game program to make the game compatible with the TSR program. In at least one embodiment, the patch can be made by disassembling the game program and locating the code that reads the joystick position count from the game port. The code can then be changed in a known manner, to have the game program execute the TSR code which scales the joystick values based upon the physiological signals.

The embodiment just described can be implemented with off-the-shelf games and simulations, such as, with a DOS-based off-the-shelf flight simulator game. Alternative embodiments are possible, for example, one such embodiment could include accomplishing the same functionality by modifying the WINMN.DLL software module in a Windows environment, or by using a separate application to trap all Application Program Interface (API) calls to joystick reading functions.

In another alternative embodiment of the "software/hardware combination" implementation of the present invention (see FIG. 1), instead of using the current count of the physiological signal 100 to multiply the stick position by, the current count is used as an index of how many stick position readings to average to get a filtered count number (e.g., a joystick response "sluggishness" modulation).

A second physiological signal 100a can be used to enable or disable the joystick buttons 106 which can be connected to the button input port 107. These joystick buttons can be momentary contact normally-open button switches, for example.

The two axes of joystick 2 allow for two independent physiological signal inputs to be applied to modulate the joystick position variables singly or in some combinations of the signals or to both axes simultaneously, or to each axis independently, or each signal to a different axis (equation sets A–C above).

The physiological signal(s) can be inverted, or not, with analog circuitry external to the computer game port, depending upon whether the object of training is to increase (as in the case of hand temperature in biofeedback-assisted relaxation training or brainwave band power ratios in neurofeedback training for attention-deficit disorder) or decrease (as is usually the case for heart rate or muscle tension in biofeedback-assisted relaxation training) the magnitude of the physiological signal(s).

In another possible embodiment of the present invention, the signal that modulates the functionality of the joystick does not have to be a monotonic function of the physiological signal, but can, for example, represent the deviation of the subject's physiological signal from a baseline level (equation set D above). The translation of deviations from baseline into degrees of joystick functionality may be done entirely in software, with the physiological signal voltage applied to the input(s) 103a for joystick 2, as described above. This procedure differs from that described above only in that the magnitude of the effect of the game controller or joystick 1 105 on the game or simulation is modulated by the maginitude of the difference between the physiological signal(s) 100, 100a being input at the joystick 2 input(s) 103a and a baseline value provided to the software by the operator.

Figure 3:
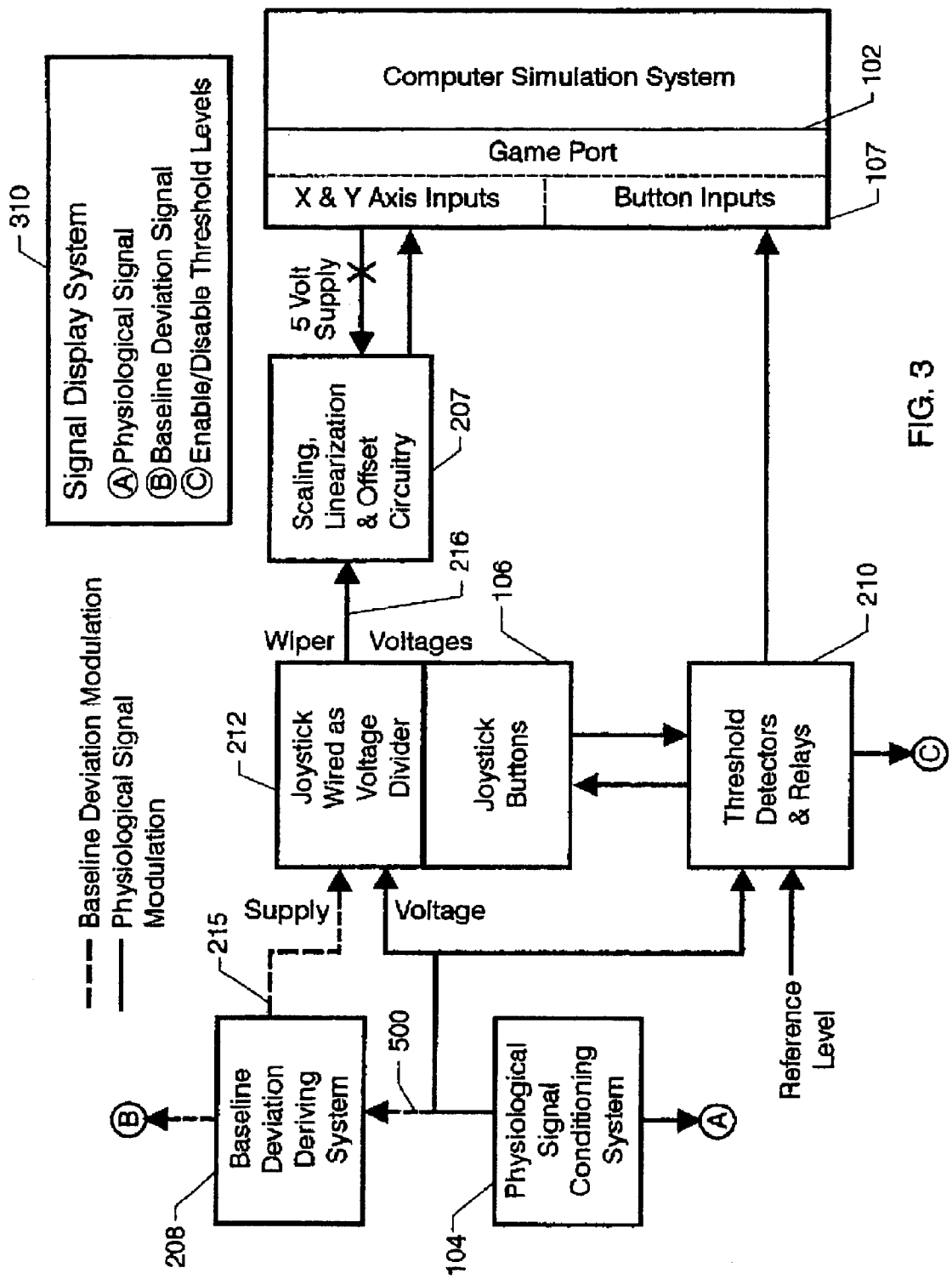
FIG. 3 is a block diagram of another embodiment for a system for the modulation of an operator's control input to a video game or training simulator according to the present invention.
Figure 4:
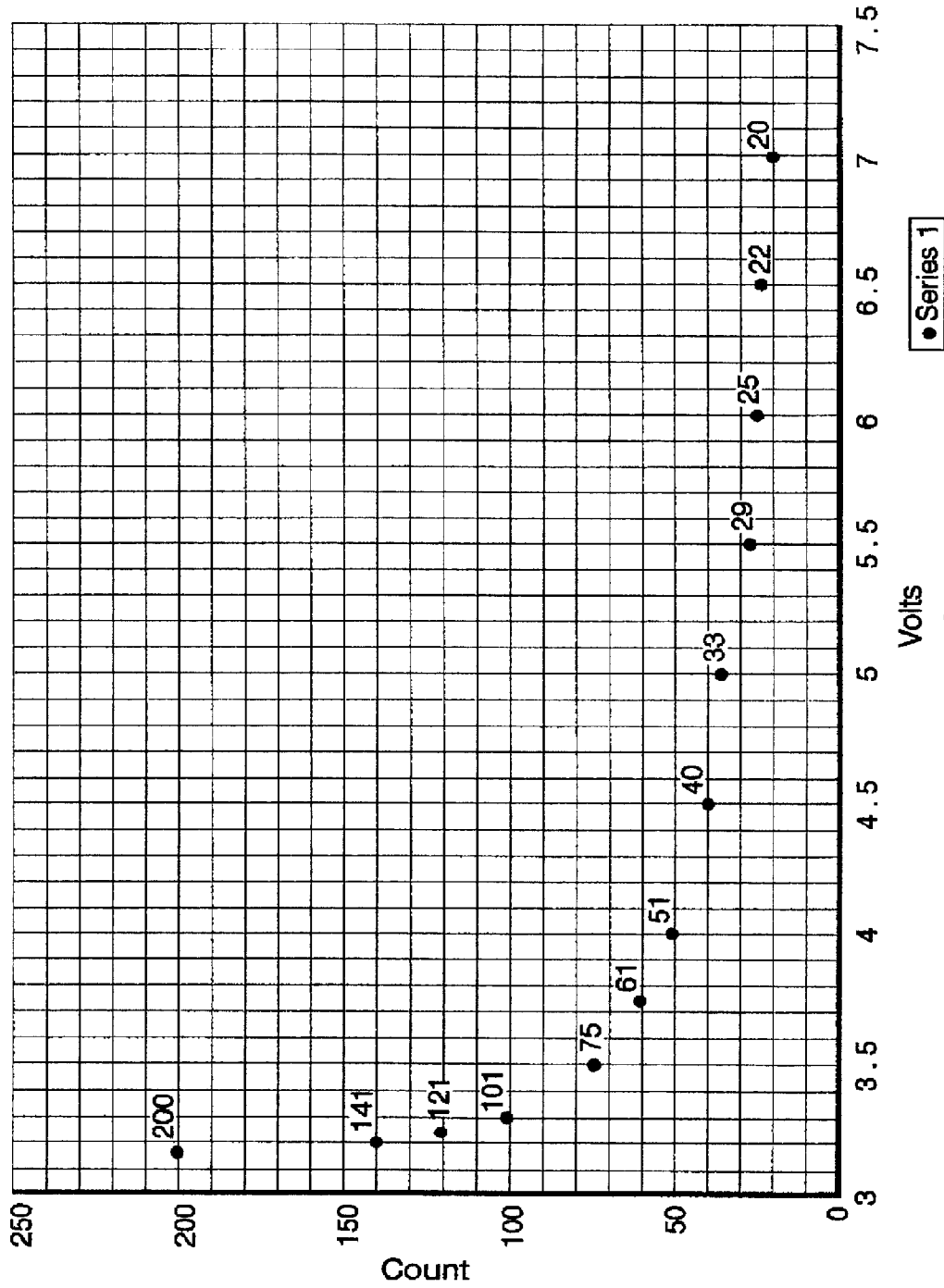
FIG. 4 is a graph relating game port circuitry count to joystick output voltage.
Figure 5:
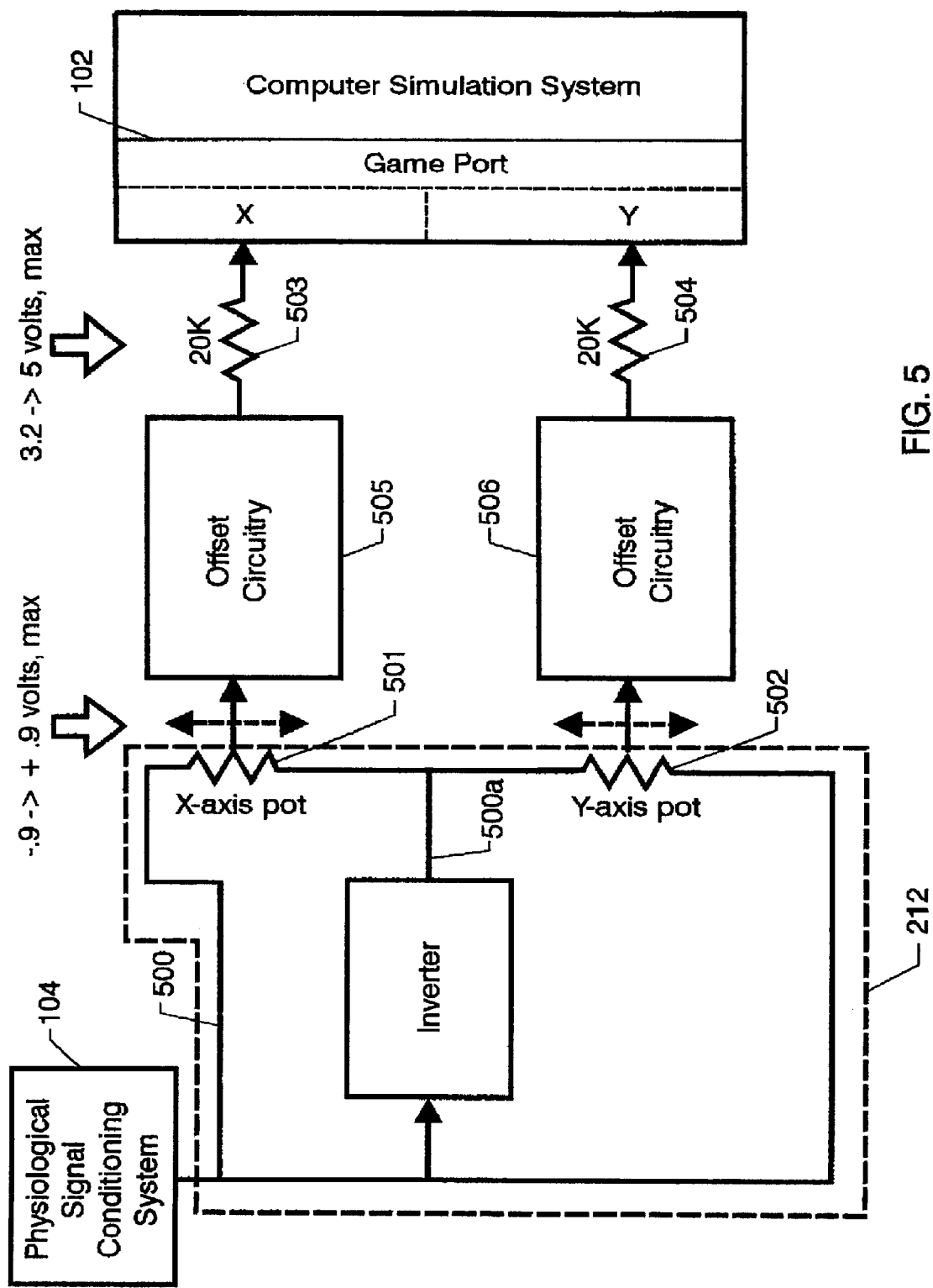
FIG. 5 is a block diagram of another embodiment for a system for the modulation of an operator's control input to a video game or training simulator according to the present invention.

FIG. 3 shows another, "hardware" embodiment of the present invention. In this embodiment the modulation operation can be performed entirely with hardware external to the computer game port, not requiring any software changes, thus allowing the joystick inputs to any off-the-shelf computer game or simulation to be modulated by a physiological signal. For example, this embodiment can be used with joysticks on a standard game system (e.g., Sony, Nintendo, etc.), or a standard computer or simulator arrangement. As described earlier, the charging circuit for each axis of a joystick is designed to cause the joystick-reading software to register a count proportional to the resistance of the circuit and inversely proportional to the applied voltage to the circuit. In conventional operation, this resistance is proportional to the position of the joystick in each axis and the applied voltage is supplied as a constant value from the game port. For the present method, this situation is reversed: the resistance is set to a constant (for example, 20 kilohms) and the applied voltage is made to vary with an analog voltage that is proportional to joystick position and also modulated by the physiological signal, or signals. As shown in the graph depicted in FIG. 4, the game port circuitry produces a count that varies nonlinearly with the input voltage in each axis within the range of approximately 5 volts to approximately 3.2 volts. To produce this input voltage in each axis, the joystick variable resistors in each axis can be reconfigured as voltage dividers (potentiometers) instead of rheostats (see FIG. 5). As shown in FIG. 5, the physiological signal 500 is connected to gone end of both of the voltage dividers 501, 502 and the inverted physiological signal 500a is connected to the other ends of the voltage dividers 501, 502. As either of the potentiometer wipers is turned from one end to the other, the voltage on the wiper changes from, for example, the current positive value of the physiological signal 500 through 0 volts to the current negative value of the physiological signal 500a. This signal is adjusted, by an amplitude control, which is part of the Physiological Signal Conditioning System 104, to have a maximum positive value of about 0.9 volts and maximum negative value of about 0.9 volts. This arrangement produces a joystick variable resistor wiper voltage that is approximately linear with respect to joystick position. As shown in FIG. 5, the resulting signal is offset by adding about 4.1 volts to each wiper signal with the offset circuitry 505, 506 to range from about 5 volts to about 3.2 volts, and then is applied through the fixed 20K resistors 503, 504 to the respective game port axis input (X and Y). With linear potentiometers 501, 502, this arrangement produces the nonlinear relationship between joystick axis position and the count read by the computer that is depicted in the graph of FIG. 4. Game software expects a linear relationship between these two variables. Therefore, the count versus voltage nonlinearity must be counteracted.

To produce the necessary linear relationship between joystick axis position and the count read by the computer, an operation that counteracts the inherent nonlinear relationship between applied voltage (from the joystick modified to be a voltage divider) and the count read by the computer must be performed. This operation needs to produce a characteristic curve that matches the count vs. voltage curve, but with joystick axis position replacing count on the y-axis. This curve representing joystick output voltage vs. joystick axis position resembles the characteristic curve of an audio taper potentiometer.

Therefore, in at least one embodiment, potentiometers with an exponential nonlinearity (audio taper) may be used to counteract the inverted logarithmic nonlinearity characteristic of the game port charging circuitry. The segment of the nonlinear potentiometer characteristic that produces the about +0.9 volt to about –0.9 volt signal sweep can be adjusted by selection of the potentiometer value, adjustment of the maximum physiological signal values, and adjustment of the 0 volt point by means of a linear trim potentiometer in series with the axis potentiometer.

To take advantage of the full nonlinear characteristic curve of an audio potentiometer requires more rotation of the potentiometer than is produced by the typical joystick (usually approximately 60 degrees), so a gearing arrangement preferably must be used to change the limited range of rotation of the joystick to a greater range (approximately 300 degrees) before the rotation is applied to the potentiometer.

Figure 6:
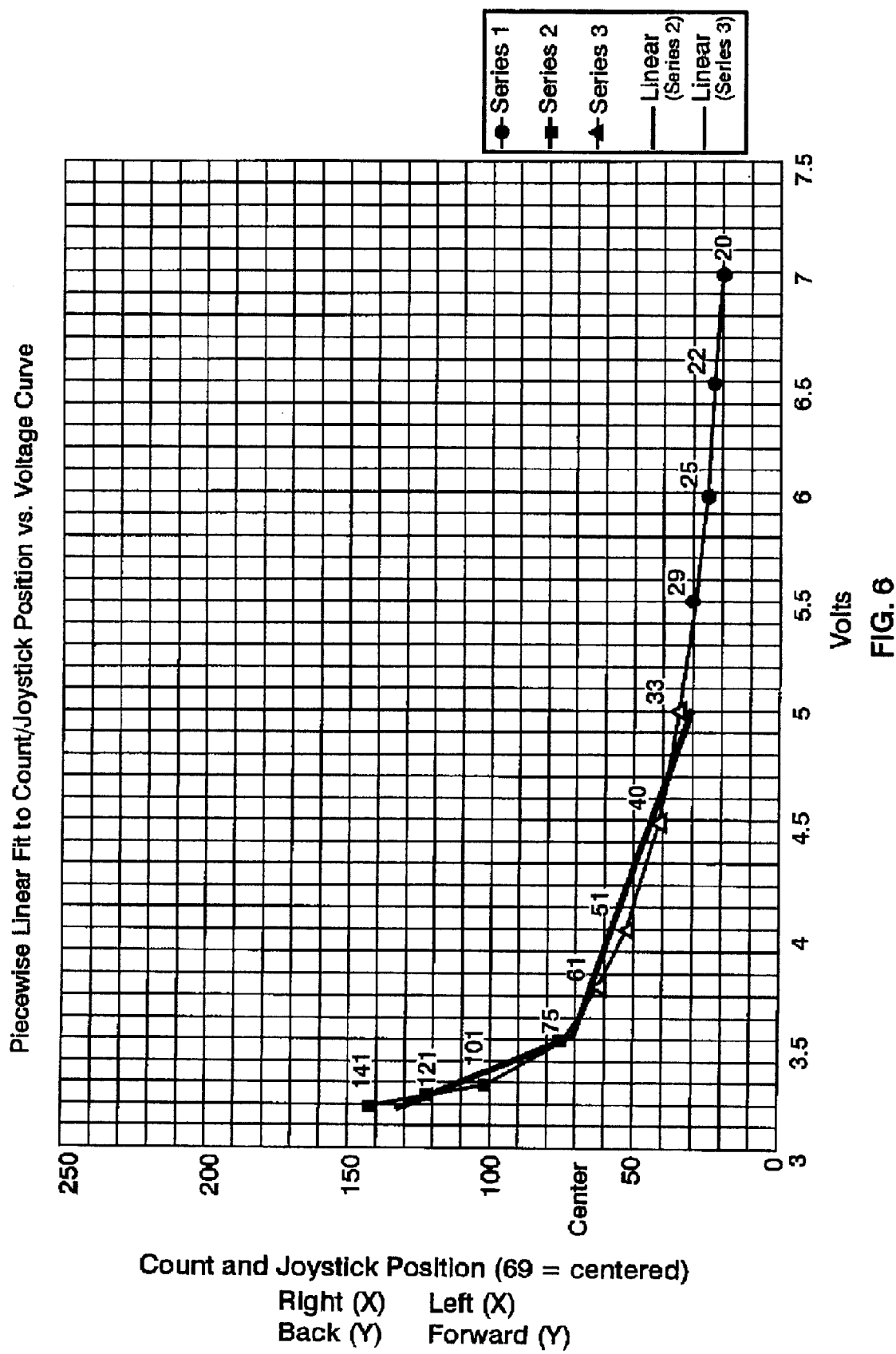
FIG. 6 is a graph showing a piecewise linear fit to the curve that represents count versus voltage (FIG. 4)

In another possible embodiment, the mechanical manipulation can be replaced by an electrical manipulation by approximating the nonlinear curve representing joystick axis output voltage vs. joystick axis position with two linear segments of different slopes intersecting at the centered point of the joystick's movement, as shown in FIG. 6. This manipulation may be accomplished by amplifying the joystick output voltage by a constant when the voltage is negative and amplifying the voltage by a different constant when it is positive. This can be accomplished electrically by applying the joystick output voltage through an adjustable gain amplifier (gain=k1) to one input leg of a linear summing amplifier and, in parallel, through another adjustable gain amplifier (gain=k2) to a second input leg of the summing amplifier. A rectifying diode in series with the input to the second adjustable gain amplifier allows only the positive voltage to be amplified by k2. The output of the summing amplifier is equal to k1 times the joystick output voltage when the voltage is negative and to k1+k2 times the joystick output voltage when the voltage is positive. This output voltage is offset before being applied to the game port circuitry to produce the range of approximately 3.2 to 5 volts for full joystick deflection from the extreme position in one direction to the extreme position in the other direction for each axis, X and Y, with maximum modulation voltage. Control of the three parameters—negative voltage amplification, positive voltage amplification, and offset, by scaling, linearization and offset circuitry 207, as shown in FIG. 3—allows a close piecewise linear approximation to the needed nonlinear curve representing joystick axis output voltage vs. joystick axis position to be achieved (see FIG. 6). Modulating the voltage applied to the joystick potentiometer end terminals symmetrically modulates the maximum count available from deflecting the joystick to one extreme or the other, and proportionately modulates all joystick positions along each axis. The center point of joystick deflection remains at the offset voltage and is not modulated.

Figure 7:
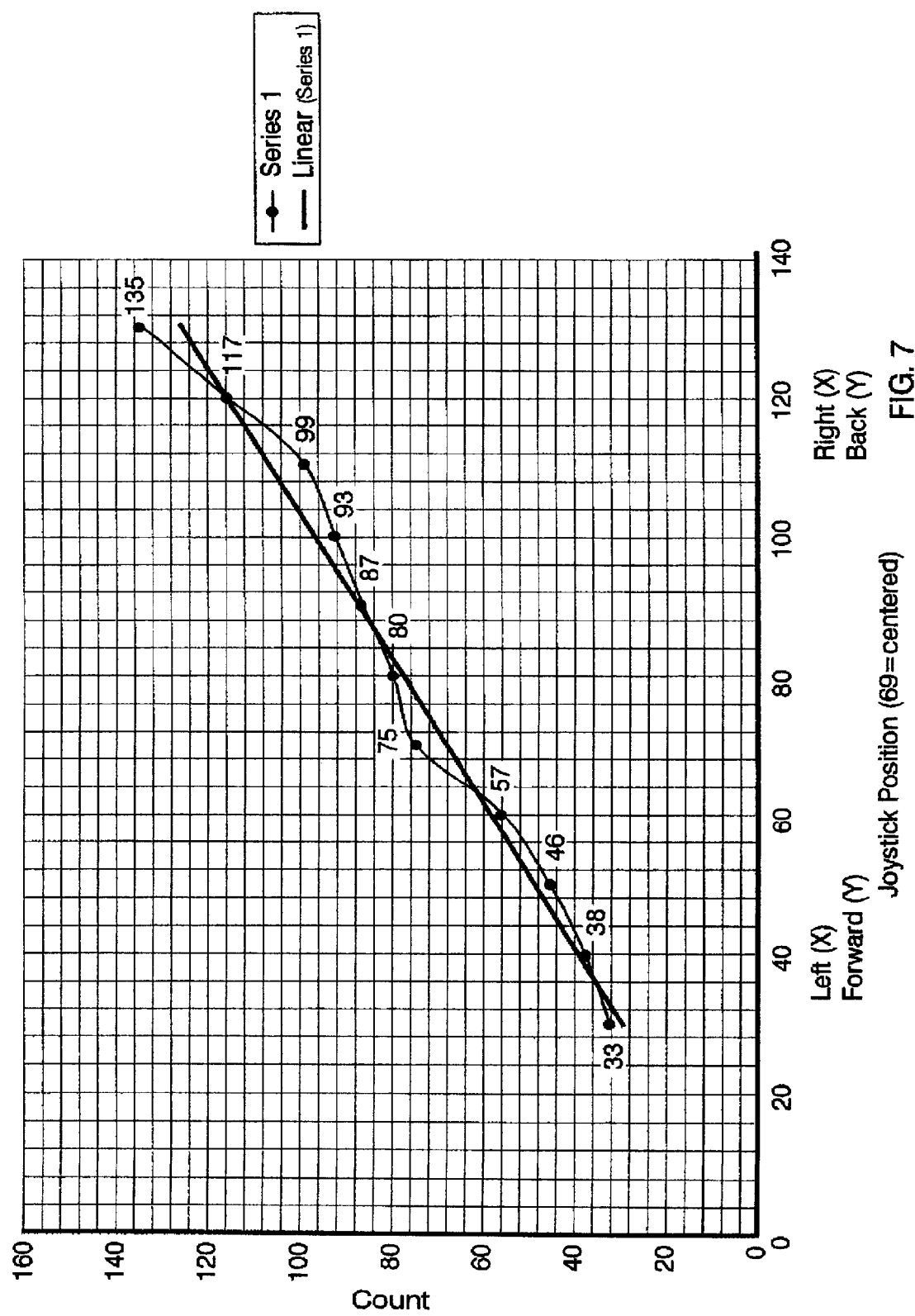
FIG. 7 is a graph relating joystick position versus game port circuitry count.

This arrangement produces an approximately linear relationship between joystick axis position and the count read by the computer, depicted in the graph shown in FIG. 7. Some joystick calibration capabilities, such as, the Windows 95 or 98 joystick calibration capability, allow further linearization to be done by the software system, enhancing the hardware linearization described above. The maximum range of the voltage at the output of the potentiometer is determined by the constantly changing value of the physiological signal voltage, resulting in modulation of the joystick input to the game port by the physiological signal.

The signal that modulates the functionality of the joystick does not have to be a monotonic function of the physiological signal, but can, for example, represent the deviation of the subject's physiological signal from a baseline level.

This can be accomplished, for example as shown in the embodiment shown in FIG. 3, by using a baseline deviation deriving system 208 that allows a baseline level to be set. When the input physiological signal 500 level is equal to the baseline setting, an output voltage of zero is present at the output. Physiological signal levels that are higher than the baseline would normally produce a positive voltage output, and signal levels lower than baseline would normally produce a negative output. Since departures from baseline in either direction preferably must have the same effect, the module output signal is internally rectified, resulting in output signal 215 voltages that increase in the positive direction whether the input physiological signal deviates upward from baseline or downward from it. The Baseline Deviation Deriving System 208 also scales, inverts, and offsets so that the physiological range will produce a voltage range corresponding to the desired range of impairment of joystick control.

The baseline deviation voltage 215 and its inverted voltage are applied to opposite ends of the joystick wired as a voltage divider 212. The resulting joystick wiper voltage 216 is scaled, linearized, and offset as described above, to produce the range of approximately 3.2 to 5 volts for full joystick deflection from the extreme position in one direction to the extreme position in the other direction for each axis, X and Y, with maximum modulation voltage.

For example, if a temperature deviation from baseline of 3 degrees is intended to cause full impairment of control, the rectified module output signal is scaled, clipped, inverted and offset to produce a maximum positive value of 0.9 volts for 0 degrees temperature deviation from baseline, and a minimum value of 0 volts for 3 degrees deviation. The resulting output signal 215 is connected to one end of the joystick voltage divider and the inverted signal is connected to the other. The resulting voltage divider wiper signal 216 is scaled, linearized and offset to range from a maximum possible of 5 volts to a minimum possible of 3.2 volts as above, see FIG. 3.

As shown in FIG. 3, if the impairment in functionality is intended to be modulated by deviation of the physiological signal from a set window (dead zone) around the baseline level, rather than from the baseline level itself, the rectified module output signal can be gated off for all values within that window by use of a comparator, which is internal to Baseline Deviation Deriving System 208, set at the window limits and connected to an analog gate module following the rectifier module, which gate module and rectifier module can also be internal to Baseline Deviation Deriving System 208. The output of the analog gate module will have a value of zero until the rectified signal exceeds the window limit, at which point the gate output will jump to the level of the limit and increase from there. If, for example, a temperature deviation from baseline of 3 degrees is intended to cause full impairment of control with no impairment occurring until the temperature deviation from baseline exceeds 1 degree, the window limit is set to correspond to 1 degree. In this example, the gate output can then produces 0.9 volts for 0 to 1 degree temperature deviation from baseline, and a range of approximately 0.6 volts to approximately 0 volts for 1 to 3 degrees temperature deviation from baseline, representing ⅓ to complete impairment of joystick 1 212 functionality.

The resulting signal 215 is connected to one end of the joystick voltage divider, which is internal to the Joystick Wired as Voltage Divider 212, and the inverted signal is connected to the other end. The resulting voltage divider wiper signal 216 is scaled, linearized and offset to range from a maximum possible of about 5 volts to a minimum possible of about 3.2 volts as above described in reference to FIG. 3. FIG. 5 shows additional details of one possible embodiment of the Joystick Wired as Voltage Divider 212.

As shown in FIG. 3, the ability to control joystick buttons 106 may be made contingent on producing criterion values of the physiological signal. Buttons are turned off by breaking the switch closure circuit for that button with a relay closure within the Threshold Detector & Relays 210, in series with the button circuit. The relay can be driven by the binary output of a voltage comparator whose threshold level can be adjusted as training progresses to shape the physiological response in the desired direction.

Figure 8:
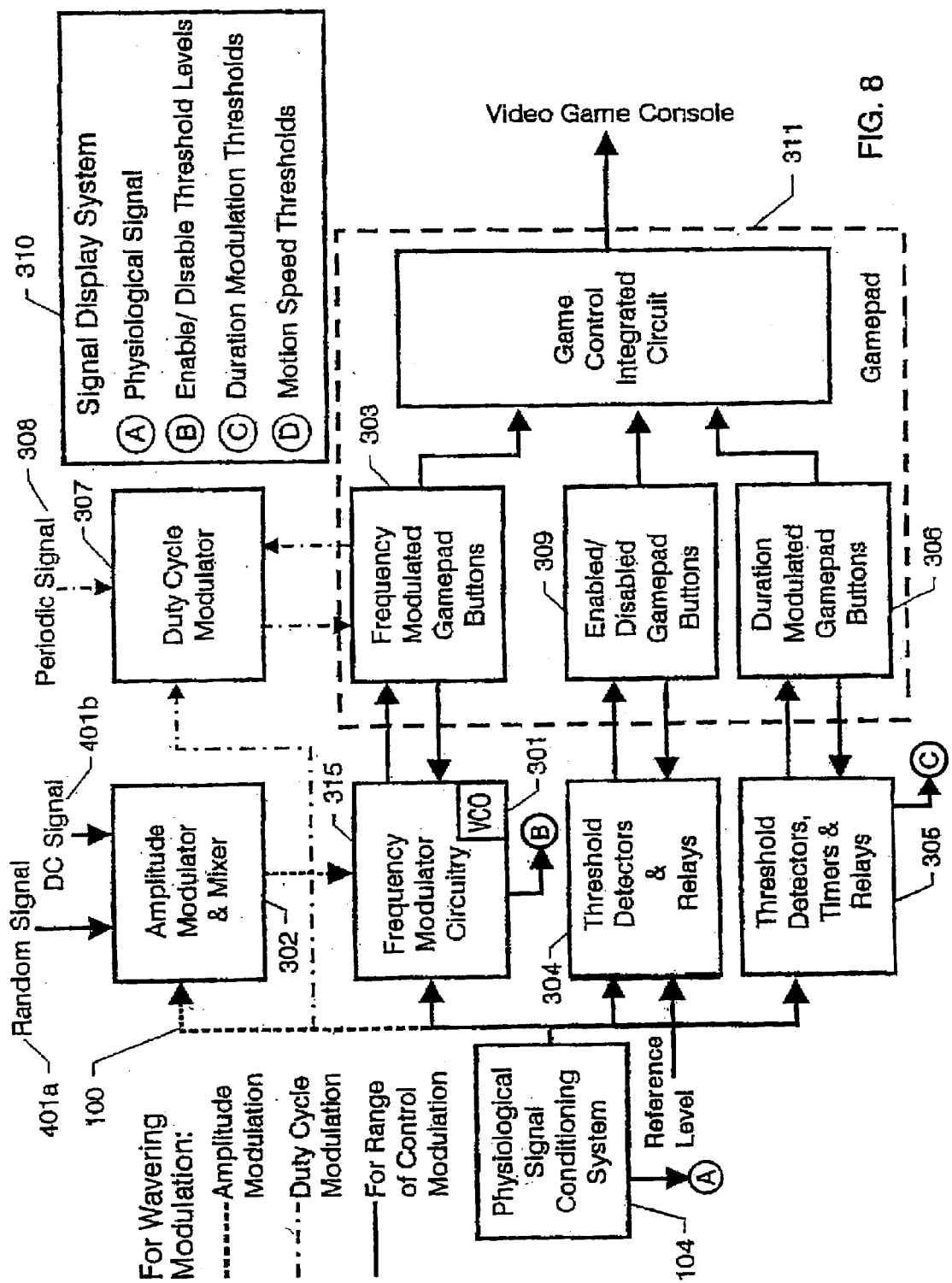
FIG. 8 is a block diagram of another embodiment for a system for the modulation of an operator's control input to a video game or training simulator according to the present invention.

FIG. 8 is a block diagram of another possible embodiment of the present invention, namely, a "Video Game Pad" implementation of the present invention. Video "game pads" 311 use discrete switches operated by button presses instead of variable resistors in the game controller. Therefore, the modulation of an analog input will not work with this type of video game controller. Instead, a form of "frequency modulation" may be used whereby the switch closures that control the movement of the player's character across the screen are pulsed at a frequency proportional to the physiological signal being monitored. This can be accomplished by driving a voltage-controlled oscillator (VCO) 301 (which is part of the Frequency Modulation Circuitry 315) with the physiological signal, and passing the frequency modulated (FM) square wave output of the VCO 301 to reed relays or solid state relays (in the Frequency Modulation Circuitry 315) that take the place of the game controller button switch closures that control motion of the player's game character or object. The FM signal is gated (AND gate) to the relay controlling one direction of movement (say, right) motion by the switch closure operated by the game controller's original button 303 that controlled movement in that direction, and the same for movement in the other direction (say, left). To get appropriate movement of the character, it is necessary to shape the VCO signal with a retriggerable one-shot set at a duration determined by trial-and-error adjustment. Since the one-shot is retriggerable, when the VCO frequency is higher than 1/(duration of the one-shot), the signal to the relay is constant, the relay closes as long as the controller button is pressed, and the game character moves at its maximum speed. In accordance with at least one application of the present invention, the player's ability to control the movement of his character can be affected. For example, the player's character moves only in short bursts when the physiological signal is low, and progress is slow. The interval between bursts decreases as the physiological signal increases, and progress speeds up. (Some characters can appear to tiptoe or sputter at these speeds.) At a high enough value of the physiological signal, the player has the full original control of the character's movement, and the character breaks into a run or full speed if the controller button is held down. Since the character's speed is modulated by the physiological signal in this way, the player is reinforced for producing high values of the physiological signal.

In at least one embodiment, a corresponding modulation of speed by physiological input can be achieved for a joystick with throttle control, such as that provided for racing and flight simulation games, by modulating the throttle control input (usually applied to the game port x-axis terminal for a second joystick) with a signal derived from the physiological signal in a manner similar to that described for modulation of the range of joystick x- and y-axis control described above. For example, at a high enough value of the physiological signal, the player has the full original control of the game object's (racecar, aircraft, game character, etc) forward movement by means of the throttle control. Since the object's horizontal speed can be modulated by the physiological signal in this way, the player is reinforced for producing high values of the physiological signal.

In the Sony Playstation game, "Metal Gear Solid," the game character can take specific measures to steady a wavering of his aiming; the wavering returns as the effect wears off. In the Star Wars-based Nintendo game, "Rogue Squadron," the player's spacecraft becomes harder to control when R2D2 is damaged. In accordance with the present invention, this unsteadiness in controllability can be modulated by physiological signals with the current invention, making game controllability a true reflection of player state.

Figure 9:
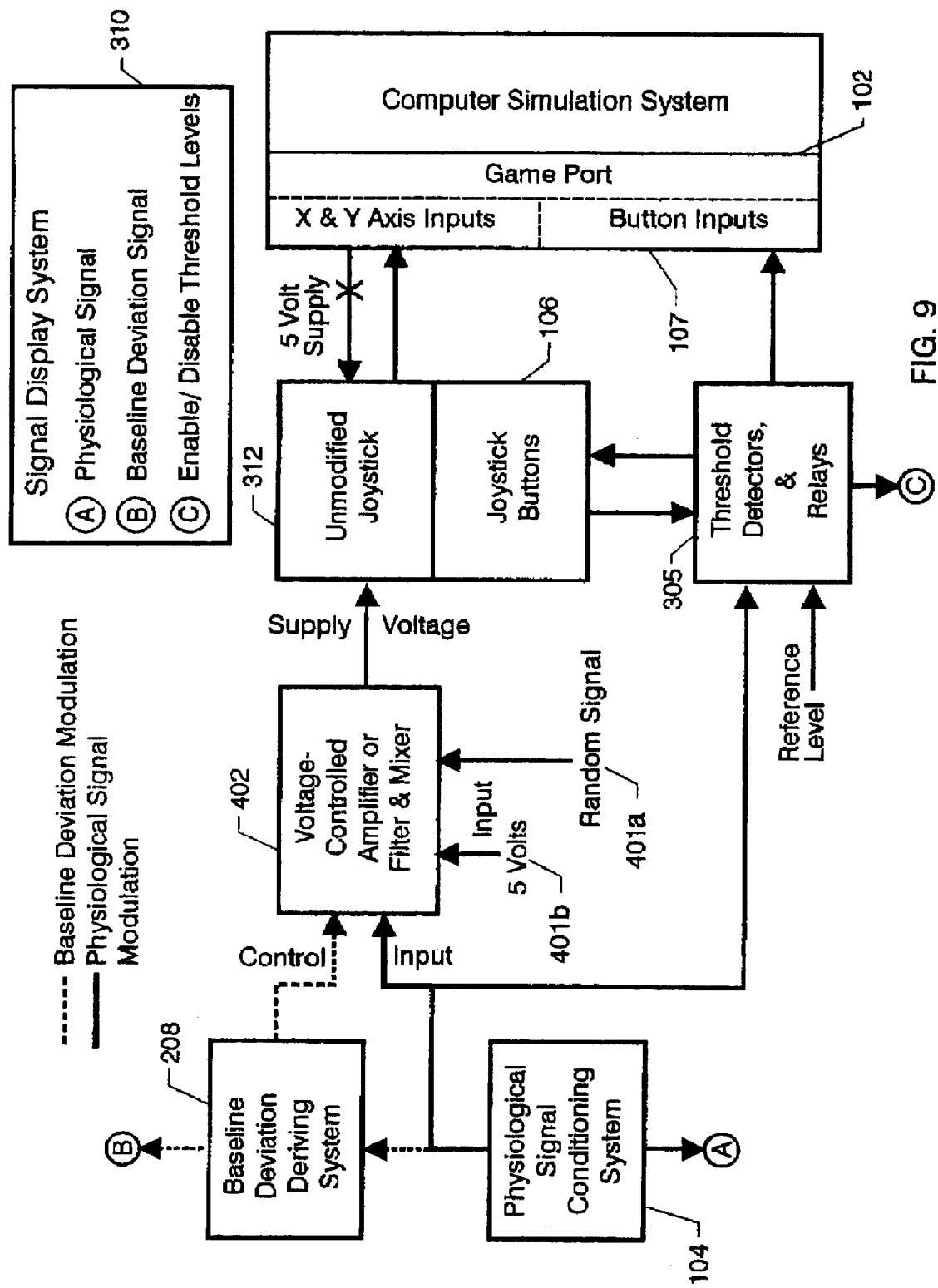
FIG. 9 is a block diagram of still another possible embodiment for a system for the modulation of an operator's control input to a video game or training simulator according to the present invention.

As an alternative to modulation of range of control by a physiological signal, the reinforcement criterion can be based upon modulation of an uncontrolled disturbance by the physiological signal. As shown in FIG. 9, with a joystick implementation, this modulation can be accomplished by mixing a randomly fluctuating signal 401*a* with a DC signal (5 volts in the shown embodiment) 401*b* and applying it as the supply voltage to the unmodified joystick 312 rheostats in place of the constant 5 volts from the game port. The amplitude of the randomly varying signal, is modulated by the physiological signal prior to mixing, which modulating and mixing is performed by the Voltage Controlled Amplifier or Filter and Mixer 402. A change in the physiological signal in the desired direction diminishes the amplitude of the random signal and, consequently, the fluctuations superimposed on the DC supply voltage to the joystick. The resulting effect upon the game or simulation is to create a wavering of the controlled object that is experienced as a loss of precision controllability as the physiological signal departs from criterion; with an aircraft simulation, for example, this is experienced as "buffet." This control variability ranges from a maximum of operating as if the joystick is only able to apply a directional bias to a randomly moving object to a minimum of no wavering and full joystick control when the physiological signal is maximum.

In at least one embodiment of the gamepad implementation, as shown in FIG. 8, this modulation can be accomplished by subtracting a randomly varying monopolar signal 401*a* from a DC signal 401*b* and applying the result to the voltage controlled oscillator (VCO) 301. The amplitude of the random signal 401*a* is modulated by the physiological signal prior to substracting, which subtracting is performed by the Amplitude Modulator & Mixer 302, with the amplitude of the DC signal equal to the amplitude that corresponds to the "constantly on" frequency of the VCO range. [When the VCO frequency is higher than 1/(duration of the one-shot), the signal to the relay is constant, the relay closes as long as the controller button is pressed, and the game character moves, for instance, at its maximum speed.]

A change in the physiological signal in the desired direction diminishes the amplitude of the random signal and, consequently, the effect of its subtraction from the DC signal. The resulting effect upon the game is to create a wavering of the controlled object that is experienced as a loss of precision controllability as the physiological signal departs from criterion. This control variability ranges from a maximum of operating as if the directional control button is only able to apply a directional bias to an alternately accelerating and decelerating object, through stages of the object accelerating and decelerating less while making directional progress, to a minimum of full, unwavering directional control when the physiological signal is maximum.

The amplitude modulation of the random signal may be accomplished with a voltage-controlled amplifier or by passing the random signal through a voltage-controlled filter, the filter's control voltage being the properly conditioned physiological signal. The amplitude of the random signal to the VCO can be either attenuated or amplified in response to changes in the physiological signal. For example, the random signal amplitude could be increased as the physiological signal increases, or decreased as the physiological signal increases. Likewise, it is also possible that the random signal amplitude could be increased or decreased as the physiological signal decreases..

An alternative implementation of the random modulation function for the gamepad, shown in FIG. 8, involves modulating the duty cycle of the pulses to the directional control relays located in the Frequency Modulated Gamepad Buttons 303 with complementary logic signals from the Duty Cycle Modulator 307. A periodic waveform 308 (e.g., triangle wave) is input to a voltage comparator and the physiological signal, properly amplified and level shifted, is applied as the comparison threshold signal. The physiological signal 100 is adjusted to range from 0 volts to beyond the maximum half-wave amplitude of the periodic input signal. The duty cycle of the resulting logic output ranges from about 50% when the physiological signal 100 is zero to 0% when the physiological signal is above the periodic signal maximum amplitude. The duty cycle of the complementary logic output ranges from about 50% when the physiological signal is zero to about 100% when the physiological signal is above the periodic signal maximum amplitude. These logic signals are each ANDed with the directional command logic signals from the switch buffers. When a directional control button is pushed, the duty cycle of the comparator "straight" AND logic output ranges from about 50% when the physiological signal is zero to 0% when the physiological signal is above the periodic signal maximum amplitude. The duty cycle of the comparator complementary AND logic output ranges from about 50% when the physiological signal is zero to 100% when the physiological signal is above the periodic signal maximum amplitude. The logic output of each of the "straight" and the complement AND gates corresponding to one directional control is connected to a different OR gate, and the outputs of the two other AND gates are connected, but in reverse order, to the same OR gates. The logic outputs of the comparator complement AND gates are connected to the OR gate commanding the directional control relay corresponding to the directional control button attached to those AND gates. The logic outputs of the comparator "straight" AND gates are connected to the OR gate commanding the opposite directional control relay. The resulting effect upon the game is to create a wavering of the controlled object that is experienced as a loss of precision controllability. This control variability ranges from a maximum of operating as if the directional control button is applying only a small directional bias to a alternately reversing object, through stages of the object occasionally reversing direction from the commanded direction, to a minimum of no reversing and full, uninterrupted directional control.

Other functions which can be accomplished by the Enabled/Disabled Gampad Buttons 309 of a video game pad controller (see FIG. 8) may be made contingent on producing high values of the physiological signal 100. Binary functions (either active or not), such as fighting action or availability of weapons or ducking action, for example, can be turned off by breaking the switch closure circuit for that function with a relay closure in series with the circuit. The relay is driven by the binary output of a voltage comparator, internal to the Threshold Detectors & Relays 304, whose threshold level can be manually (or automatically) adjusted as training progresses to shape the physiological response in the desired direction.

Some game pad controller functions are capable of being operated to several discrete levels. For example, the jumping function may have several discrete levels. In some systems or games, the duration of the game controller jump switch closure (operated by button press) can determine the height of the character's jump. For example, in this instance, three distinct heights can be achieved by pressing the controller button either briefly or longer. This button press action can be duplicated by three reed relays separately controlled by one-shot timers set at short, medium, and long durations (in FIG. 8 these relays and timers are part of the Threshold Detectors, Timers & Relays 305). As shown in FIG. 8, the relays can replace the jump switch closure which is part of the Duration Modulated Gamepad Buttons 306 in the gamepad controller 311, and the selected timer is operated by the game controller jump switch closure. The selected timer is determined by ANDing the game controller jump switch closure with each of the binary outputs of a three-level voltage comparator (or threshold detector), which comparator is also a part of the Threshold Detectors, Timers & Relay 305 in FIG. 8. When the physiological signal exceeds one of the comparator levels, the AND gate to the corresponding timer is opened and the next jump switch closure is passed to that timer, closing its connected relay for the timer's duration. The timer durations are set in ascending order to correspond to ascending levels of the comparator settings. In this way, the player is reinforced for more desirable values of the physiological signal (for example, either higher or lower values, depending on what physiological signal is being monitored) by having the character's jump height capability increased. As in the case of binary functions above, the voltage comparator's threshold level is adjusted as training progresses to shape the physiological response in the desired direction.

More recent video "game pads" incorporate analog joysticks as well as discrete switches in the game controller. These controllers can be modulated by employing the methods for both the joystick and the gamepad implementations described above. The modulation, enabling, and button press duration modulation operations can also be performed entirely with the software proprietary to the video game manufacturer, requiring no hardware modifications. As described for the joystick implementation above, different physiological signals and their training criteria can be applied to different game functions concurrently, enabling training to be directed at multiple simultaneous objectives.

In at least one embodiment, a data acquisition and display system 310, such as an analog to digital conversion system, can be used to provide an operator (usually someone other than the player of the game or the trainee, for example, a clinician or researcher) real-time data feedback and an ability to set thresholds and gains of the modulation according to the various physiological signals. In at least one embodiment, this display can be used to provide the operator with a scrolling display of the relative levels of the physiological signal(s), the adjustable comparator thresholds that define controller button enabling and disabling, and the empirically set voltage thresholds that define the various movement speeds and styles (e.g., "tiptoeing", "limping", "full run", etc.), for example. The specific presentation and location of the data display 310, if any, can vary depending upon the embodiment and/or components of the system being used, and/or upon who is monitoring the display (for example, the clinician or the player). However, in the preferred embodiment this data feedback is not displayed on the same screen viewed by the player or trainee, for the reasons explained hereinabove, but rather is displayed separately, for example, on a different display terminal. In at least one embodiment, for example as shown in FIG. 8 as a "Signal Display System" 310 this tracking function can be provided by the J&J I-330 system, running the "USE" software. The operator is thus guided by the display of the relative levels of the signal(s) and the criteria in performing the shaping procedure described above. Further, in at least one embodiment of the invention this data acquisition and display system can be designed to provide for the transmission of the information over the internet to a distant location, such as to a doctor's office, for example. It is also within the scope of the present invention that software could be designed such that the shaping procedure, including the analyzing of the data feedback and the setting of thresholds and gains of the modulation, can be automatically calculated and adjusted by the system.

In accordance with at least one embodiment of the present invention, the disclosed apparatus and methods can be used specifically for entertainment purposes. For example, a player might simply use the system for the enjoyment and challenge of mastering a game or simulation, as well as the satisfaction of controlling his own physiological states. It is also within the scope of the present invention that a player could entertain himself by personally using data feedback to set challenges, thresholds and goals for himself to achieve.

Further, it is within the scope of the present invention to utilize a variety of input devices or controllers, as well as to utilize not just joystick or gamepad input ports, but to utilize a variety of other computer input ports as well, and thus varying the connection apparatus, as appropriate, to accommodate the type of port and/or system being utilized. The present invention could possibly utilize interface devices such as touch pads, light pens, power gloves, keyboards and weapons (e.g., hand-held guns), for example. Additionally, it should be noted that when the term "counts" has been used herein the term potentially reffered to any one of a variety of types or forms of information that a computer, video game system, and/or training simulator might receive at a computer or game port. For example, it is within the scope of the present invention that the information that the computer software reads from a port could be in the form of a digital value which can be expressed as a number, counts, etc.

Additionally it is expressly within the scope of the present invention that substantially all of the aforementioned and/or described hardware used in the above described embodiments of the present invention could be replaced with software. That is to say, for example, many functions, such as comparators, timers, threshold detectors, relays, voltage controlled amplifier, voltage controlled modulator, offset circuitry, AND gates, VCO, baseline deviation deriving system, etc., can be accomplished with software. For example, these functions could possibly be programmed in what is commonly known as a "virtual instrument" environment, such as National Instruments' LabView. In at least one embodiment, this type of environment would allow hardware used in the present invention to be replaced by functional modules represented as icons on a screen, which can be set-up and "wired" together. The resulting software system can then function just like its hardware counterpart, for example, interacting with external signals through analog and digital input and output boards installed in the computer.

The present invention fully integrates biofeedback training into a true dynamic video game, or realistic simulation, that turns the popular home pastime of playing video games into an opportunity for therapy or self-improvement. It is the prototype of a new generation of computer game environments that train valuable mental skills beyond eye-hand coordination.

Current systems typically deliver biofeedback in bland, minimally motivating task formats with direct feedback. The present invention's video game or task challenge format motivates trainees to participate in and adhere to the training process through the rewards inherent in mastery of popular video games or job simulators, and without the demand, monotony or frustration potential of direct concentration on physiological signals.

It should be understood by those skilled in the art that the descriptions and illustrations herein are by way of examples and the invention, or inventions, are not limited to the exact details shown and described. It is understood that the invention(s) is in no way limited to the above embodiments, and is capable of numerous modifications within the scope of the specification and following claims.

What is claimed is:

1. A method for modifying the effect of an operator controlled input device on an interactive device to encourage the self-regulation of at least one physiological activity by the operator, the interactive device comprising a display area which depicts images, and apparatus for receiving at least one input from the operator controlled input device to thus permit the operator to control and interact with at least some of the depicted images, said method for modifying comprising the steps of:

measuring at least one physiological activity of the operator to obtain at least one physiological signal having a value indicative of the level of the at least one physiological activity;

modifying the ability of the operator to control and interact with at least some of the depicted images; and said step of modifying the operator's ability comprising modifying the input from the operator controlled input device in response to changes in the at least one physiological signal.

2. The method according to claim 1, wherein the interactive device comprises software for controlling the displayed images, the input from the operator controlled device comprises control signals, and said step of modifying the input from the operator controlled input device comprises the step of:

transforming the control signals in response to changes in the at least one physiological signal, prior to the control signals being used by the device software.

3. The method according to claim 2, wherein said step of transforming the control signals comprises modulating the magnitude of the effect of the control signals on the interactive device and, consequently, on the ability of the operator to control and interact with at least some of the depicted images, substantially proportionally to the level of the at least one physiological signal.

4. The method according to claim 1 wherein said step of measuring at least one physiological activity comprises measuring at least one of:
autonomically-mediated physiological activity, and brainwave electrical activity.

5. The method according to claim 4 wherein the autonomic physiological activity comprises at least one of:
skin temperature;
skin conductance;
electrical activity of muscles;
blood flow;
heart rate;
heart rate variability; and
respiratory rate.

6. The method according to claim 4 wherein the brainwave electrical activity comprises at least one of:
event-related potentials; and
at least one brainwave frequency band;
the at least one brainwave frequency band comprising at least one of:
a) theta,
b) alpha,
c) SMR,
d) beta, and
e) gamma.

7. The method according to claim 1 further comprising the step of displaying the at least one physiological signal having a value indicative of the level of the at least one physiological activity.

8. The method according to claim 7 wherein said step of displaying comprises displaying and monitoring the physiological signal on a signal display system substantially separate from the interactive device.

9. The method according to claim 3, wherein said step of modulating the magnitude of the effect of the control signals on the interactive device and, consequently, on the ability of the operator to control and interact with at least some of the depicted images, substantially proportionally to the level of the at least one physiological signal comprises the device software registering at least one digital value derived from the at least one physiological signal, which is proportional to the magnitude of said at least one physiological signal.

10. The method according to claim 9, further comprising the step of registering the at least one physiological signal digital value by keeping the resistance input to the interactive device set to a constant and registering the voltage physiological input to the interactive device.

11. The method according to claim 9, wherein the control signals are converted to digital values, and said step of modulating the magnitude of the effect of the control signals on the interactive device and, consequently, on the ability of the operator to control and interact with at least some of the depicted images, substantially proportionally to the level of the at least one physiological signal comprises utilizing the physiological signal digital value to modify the control signal digital values prior to the control signal digital values being used by the device software.

12. The method according to claim 11, wherein said step of utilizing the physiological signal digital value to modify the control signal digital values comprises utilizing terminate and stay resident (TSR) software to at least one of:

modulate the control signal digital values with the physiological signal digital value; and
time average the control signal digital values based on the physiological signal digital value.

13. The method according to claim 2, wherein the control signals have at least two position variables and said step of transforming the control signals in response to changes in the at least one physiological signal, prior to the control signals being used by the device software, comprises at least one of:
modulating at least one of the at least two position variables with an individual one of the at least one physiological signal; and
modulating at least another one of the at least two position variables with a combination of ones of the at least one physiological signal.

14. The method according to claim 2, wherein the at least one physiological signal represents a deviation from a baseline signal level.

15. The method according to claim 2, wherein the operator controlled input device comprises a joystick having a plurality of stick positions, the control signals comprise digital values, and said step of transforming the control signals in response to changes in the at least one physiological signal, prior to the control signals being used by the device software comprises the step of utilizing the values of the at least one physiological signal as an index of the number of joystick positions readings to average to get a filtered control signal digital value.

16. The method according to claim 2, wherein the operator controlled input device comprises control buttons, the at least one physiological signal comprises two physiological signals, and said step of transforming the control signals in response to changes in the at least one physiological signal, prior to the control signals being used by the device software includes at least one of:
utilizing at least one of the two physiological signals to enable and disable the control buttons; and
utilizing one of the two physiological signals to enable and disable the control buttons, and the other one of the two physiological signals to control the joystick.

17. The method according to claim 2, wherein the control signals and the at least one physiological signal each comprise digital values, and said step of transforming the control signals in response to changes in the at least one physiological signal, prior to the control signals being used by the device software comprises the step of:
utilizing terminate and stay resident (TSR) software to one of:
modulate the control signal digital values with the physiological signal digital value; and
time average the control signal digital values based on the physiological signal digital value.

18. Apparatus for modifying the effect of an operator controlled input device on an interactive device, the interactive device comprising a display area, means for depicting images upon the display area, and means for receiving control input from the operator controlled input device, the control input permitting the operator to control and interact with at least some of the depicted images, said modifying apparatus comprising:
means for measuring at least one physiological activity of the operator;
means for converting the at least one measured physiological activity into at least one physiological signal having a value indicative of the level of said at least one physiological activity; and means for modifying the operator's control input in response to changes in the at least one physiological signal, to thus modify the operator's ability to control and interact with at least one of the depicted images in response to changes in the at least one physiological signal.

19. The modifying apparatus according to claim 18, wherein the interactive device comprises software for controlling said displayed images, the control input comprises control signals, and wherein:
said modifying means comprises an arrangement to transform the control signals in response to changes in the at least one physiological signal prior to the control signals being used by the interactive device software.

20. The modifying apparatus according to claim 19, wherein said transforming arrangement comprises means for modulating the magnitude of the effect of the control signals on the interactive device and, consequently, on the ability of the operator to control and interact with at least some of the depicted images, substantially proportionally to the level of the at least one physiological signal.

21. The modifying apparatus according to claim 18 wherein the at least one physiological signal comprises at least one of:
autonomically-mediated physiological activity, and
brainwave electrical activity.

22. The modifying apparatus according to claim 21 wherein the autonomic physiological activity comprises at least one of: skin temperature;
skin conductance;
electrical activity of muscle;
blood flow through the skin;
heart rate;
heart rate variability; and
respiratory rate.

23. The modifying apparatus according to claim 21 wherein the brainwave electrical activity comprises at least one of:
event-related potentials; and
at least one brainwave frequency band; and
said at least one brainwave frequency band comprises at least one of
a) theta,
b) alpha,
c) SMR,
d) beta,
e) gamma, and
f) combinations of a)–e).

24. The modifying apparatus according to claim 18 comprising:
means for displaying at least one signal; and
said displaying means being operatively connected to said means for converting the at least one measured physiological activity into at least one physiological signal having a value indicative of the level of said at least one physiological activity to permit the displaying of the at least one physiological signal.

25. The modifying apparatus according to claim 24 wherein:
said displaying means comprises a signal display system: and said signal display system comprises a display screen substantially separate from the display area of the interactive device.

26. The modifying apparatus according to claim 20, wherein the device software registers at least one digital value derived from the at least one physiological signal which is proportional to the magnitude of said at least one physiological signal.

27. The modifying apparatus according to claim 26, comprising:
means for registering the at least one physiological signal digital value; and
said registering means comprising an arrangement to keep the resistance set to a constant and to register the voltage.

28. The modifying apparatus according to claim 26, wherein said control signals comprise digital values, and said transforming arrangement comprises means for utilizing said physiological signal digital value to modify the control signal digital value prior to said control signal digital value being used by the device software.

29. The modifying apparatus according to claim 28, wherein:
said means for utilizing said physiological signal digital value comprises utilizing terminate and stay resident (TSR) software; and
said terminate and stay resident software being configured to one of:
modulate said control signal digital values with said physiological signal digital value; and
time average said control signal digital values based on the physiological signal digital value.

30. The modifying apparatus according to claim 19, wherein the control signals have two position variables and said modifying apparatus comprises at least one of:
means for modulating at least one of the two position variables with an individual one of the at least one physiological signal; and
means for modulating at least one of the two position variables with a combination of ones of the at least one physiological signal.

31. The modifying apparatus according to claim 19, comprising means for determining the level of the at least one physiological signal based on its deviation from a baseline signal level.

32. The modifying apparatus according to claim 19, wherein the operator controlled input device comprises a joystick having a plurality of stick positions, the control signals comprise digital values, and said transforming arrangement comprises means for utilizing the values of the at least one physiological signal as an index of the number of joystick positions readings to average to get a filtered control signal digital value.

33. The modifying apparatus according to claim 19, wherein said means for measuring at least one physiological activity of the operator and said means for converting the at least one measured physiological activity into at least one signal having a value indicative of the level of said at least one physiological activity together forming at least a part of a physiological conditioning system.

34. The modifying apparatus according to claim 33, wherein the operator controlled input device comprises control buttons, and wherein:
said at least one physiological signal comprises at least two physiological signals; and
said transforming arrangement comprises means for utilizing at least one of said at least two physiological signals to enable and disable the control buttons and at least another one of said at least two physiological signals to control the joystick.

35. The modifying apparatus according to claim 19, wherein:

said transforming arrangement comprises terminate and stay resident (TSR) software; and said terminate and stay resident software being configured to at least one of:

modulate said control signal digital value with said physiological signal digital value; and time average said control signal digital value based on the physiological signal digital value.

36. Apparatus for modifying the effect of an operator controlled input device on an interactive device, the interactive device comprising a display area, means for depicting images upon the display area, and means for receiving input from the operator controlled input device, the input permitting the operator to control and interact with at least some of the depicted images, said modifying apparatus comprising:

means for measuring at least one physiological activity of the operator;

means for converting the at least one measured physiological activity into at least one signal having a value indicative of the level of said at least one physiological activity; and means for modifying the input from the operator controlled input device prior to the input being received by the interactive device; and said modifying means comprising means for modifying the input from the operator controlled input device in response to changes in the at least one physiological signal, to thus modify the operator's ability to control and interact with at least one of the depicted images in response to changes in the at least one physiological signal.

37. The modifying apparatus according to claim 36, wherein the interactive device comprises software for controlling the displayed images, the input from the operator controlled input device comprises control signals, and wherein:

said modifying means comprises an arrangement to transform the control signals in response to changes in the at least one physiological signal prior to the control signals being used by the interactive device software.

38. The modifying apparatus according to claim 37, wherein said transforming arrangement comprises means for modulating the magnitude of the effect of the control signals on the interactive device and, consequently, on the ability of the operator to control and interact with at least some of the depicted images, substantially proportionally to the level of the at least one physiological signal.

39. The modifying apparatus according to claim 36 wherein the at least one physiological signal comprises at least one of:

autonomically mediated physiological activity; and brainwave electrical activity.

40. The modifying apparatus according to claim 39 wherein the autonomic physiological activity comprises at least one of: skin temperature;

skin conductance;

electrical activity of muscle;

blood flow;

heart rate;

heart rate variability; and respiratory rate.

41. The modifying apparatus according to claim 39 wherein the brainwave electrical activity comprises at least one of:

event-related potentials; and at least one brainwave frequency band; and said at least one brainwave frequency band comprising at least one of:

a) theta, b) alpha, c) SMR, d) beta, e) gamma, and f) combinations of a)–e).

42. The modifying apparatus according to claim 36 comprising:

means for displaying at least one signal;

said displaying means being operatively connected to said means for converting the at least one measured physiological activity into at least one signal having a value indicative of the level of said at least one physiological activity to permit the displaying of the at least one signal.

43. The modifying apparatus according to claim 42 wherein:

said displaying means comprises a signal display system; and said signal display system comprises a display screen substantially separate from the display area of the interactive device.

44. The modifying apparatus according to claim 38, wherein said modifying means registers a digital value derived from the at least one physiological signal which is proportional to the magnitude of said at least one physiological signal.

45. The modifying apparatus according to claim 44, comprising:

said modifying means comprising means for registering the physiological signal digital value;

said measuring means for measuring at least one physiological activity comprises a physiological signal conditioning system; and said registering means comprising an arrangement to keep the resistance set to a constant and to vary the voltage.

46. The modifying apparatus according to claim 44, wherein:

said measuring means for measuring at least one physiological activity comprises a physiological signal conditioning system.

47. The modifying apparatus according to claim 45, wherein:

said arrangement to keep the resistance set to a constant and to vary the voltage comprises:

a joystick wired as a voltage divider operatively connected to said physiological signal conditioning system; and said wired joystick being configured and disposed to receive a signal from said physiological signal conditioning system and to convert said signal to a voltage divider wiper signal proportional to both said physiological signal and the joystick position.

48. The modifying apparatus according to claim 47, wherein said transforming arrangement further comprises means for amplifying, offsetting and scaling the wiper signal.

49. The modifying apparatus according to claim 48, wherein:

said wired joystick comprises at least one button; and said transforming arrangement comprises means for controlling said at least one button such that the operator's ability to control said at least one button is made contingent on producing criterion values of said at least one physiological signal;

said button controlling means comprises at least one of: threshold detectors, and relays.

50. The modifying apparatus according to claim 49, wherein:

said converting means comprises a baseline deviation deriving system to determine the level of the at least one physiological signal from its deviation from a baseline signal level; and said baseline deviation deriving system being operatively connected to said physiological signal conditioning system and to said wired joystick.

51. The modifying apparatus according to claim 50 comprising a signal display system operatively connected to at least one of said baseline deviation deriving system, said physiological signal conditioning system and said means for controlling said at least one button, to permit the displaying of at least one of:

the at least one physiological signal;

the base line deviation signal; and the criterion values for controlling said at least one button.

52. The modifying apparatus according to claim 46, wherein said registering means comprises an arrangement to vary the resistances presented to the interactive device and to vary the voltages presented to the interactive device, comprising:

a joystick wired as a variable resistance;

means for modulating the amplitude of a randomly varying signal with said at least one physiological signal, and for mixing said amplitude modulated randomly varying signal with a DC signal;

the output of said mixing and modulating means being operatively connected as the supply voltage to said wired joystick such that the joystick signal to the interactive device varies with both the movement of the joystick and said randomly varying signal, the magnitude of the random variations being proportional to the magnitude of the physiological signal.

53. The modifying apparatus according to claim 52, wherein said mixing and modulating means comprises at least one of:

a mixer;

a voltage controlled amplifier; and a voltage controlled filter.

54. The modifying apparatus according to claim 36, wherein the operator controlled input device comprises a game pad and wherein:

said modifying means is configured and disposed to be operatively connected to the game pad; and said modifying means comprises a transforming arrangement to transform the control signals from the game pad, in response to changes in the at least one physiological signal, prior to the control signals being received by the interactive device.

55. The modifying apparatus according to claim 54, wherein said transforming arrangement comprises means for modulating the magnitude of the effect of the control signals on the interactive device and, consequently, on the ability of the operator to control and interact with at least some of the depicted images, substantially proportionally to the level of the at least one physiological signal.

56. The modifying apparatus according to claim 55, wherein the game pad comprises at least one of:

frequency modulated game pad buttons;

game pad buttons configured to be enabled and disabled; and duration modulated game pad buttons.

57. The modifying apparatus according to claim 56, wherein:

said measuring means for measuring at least one physiological signal comprises a physiological signal conditioning system;

said modifying apparatus comprises a signal display system operatively connected to said transforming arrangement and said physiological signal conditioning system; and said signal display system being configured to display at least one of:

the at least one physiological signal;

game pad button enable and disable thresholds;

duration modulation thresholds; and motion speed threshold level.

58. The modifying apparatus according to claim 56, wherein the game pad comprises frequency modulated game pad buttons, and wherein:

said transforming arrangement comprises:

frequency modulation circuitry for producing a stream of pulses, the frequency of which is proportional to the level of said at least one physiological signal; and at least one relay; and said frequency modulation circuitry and said at least one relay being configured and disposed to alternately enable and disable said game pad buttons at a rate proportional to the frequency of said pulse stream.

59. The modifying apparatus according to claim 56, wherein the game pad comprises game pad buttons configured to be enabled and disabled, and wherein:

said transforming arrangement comprises at least one of:

threshold detectors; and relays; and said threshold detectors and relays being configured and disposed to enable and disable said game pad buttons contingent on producing criterion values of said at least one physiological signal.

60. The modifying apparatus according to claim 56, wherein the game pad comprises duration modulated game pad buttons, and wherein:

said transforming arrangement comprises at least one of:

threshold detectors;

timers; and relays; and said threshold detectors and timers and relays being configured and disposed to control the length of time a button is enabled proportional to adjustable criterion values of said at least one physiological signal.

61. The modifying apparatus according to claim 58, wherein said means for modifying the operator's control input in response to changes in the at least one physiological signal, comprises:

means for mixing and modulating, for modulating the amplitude of a randomly varying signal with said at least one physiological signal, and for mixing said amplitude modulated randomly varying signal with a DC signal; and said mixing and modulating means being operatively connected to said frequency modulation circuitry to permit the mixed and modulated signal to be transmitted to said frequency modulation circuitry.

62. The modifying apparatus according to claim 56, wherein the game pad comprises frequency modulated game pad buttons, and wherein:

said transforming arrangement comprises:

means for modulating the duty cycle of the pulses of a periodic signal in response to changes in said at least one physiological signal;

said modulating means comprising a duty cycle modulator; and said modulating means being operatively connected to said frequency modulated game pad buttons to permit the transfer of said modulated pulses to said modulated game pad buttons to thus control the functioning of said modulated game pad buttons.

63. The method according to claim 1 wherein said step of modifying the input from the operator controlled operator's control input device in response to changes in the at least one physiological signal comprises modifying the operator's control input in response to changes in the at least one physiological signal prior to the control input being received by the interactive device.

64. The method according to claim 63, wherein the interactive device comprises software for controlling the displayed images, the control input comprises control signals, and wherein said step of modifying the operator's control input comprises the step of:

transforming the control signals in response to changes in the at least one physiological signal prior to the control signals being used by the interactive device software.

65. The method according to claim 64, wherein said step of transforming the control signals comprises modulating the magnitude of the effect of the control signals on the interactive device and, consequently, on the ability of the operator to control and interact with at least some of the depicted images, substantially proportionally to the level of the at least one physiological signal.

66. The method according to claim 63 wherein said step of measuring at least one physiological activity comprises measuring at least one of:

autonomically-mediated physiological activity, and brainwave electrical activity.

67. The method according to claim 66 wherein the autonomic physiological activity comprises at least one of:

skin temperature;

skin conductance;

electrical activity of muscles;

blood flow;

heart rate;

heart rate variability; and respiratory rate.

68. The method according to claim 66 wherein the brainwave electrical activity comprises at least one of:

event-related potentials; and at least one brainwave frequency band;

the at least one brainwave frequency band comprising at least one of:

a) theta, b) alpha, c) SMR, d) beta, e) gamma, and f) combinations of a)–e).

69. The method according to claim 63 further comprising the step of displaying the at least one physiological signal having a value indicative of the level of the at least one physiological activity.

70. The method according to claim 69 wherein said step of displaying comprises displaying and monitoring the at least one physiological signal on a signal display system substantially separate from the interactive device.

71. The method according to claim 65, wherein said step of modulating the magnitude of the effect of the control signals on the interactive device and, consequently, on the ability of the operator to control and interact with at least some of the depicted images, substantially proportionally to the strength of the at least one physiological signal, comprises one of a) or b):

a) the operator controlled input device receiving a powering voltage derived from the at least one physiological signal, which is proportional to the magnitude of the at least one physiological signal; or b) utilizing a joystick wired as a variable resistance;

modulating the amplitude of a randomly varying signal with the at least one physiological signal, and mixing the amplitude modulated randomly varying signal with a DC signal, and applying the resulting signal as the powering voltage to the joystick; and wherein the mixing and modulating permits the joystick signal to the interactive device to vary with both the movement of the joystick and the randomly varying signal, the magnitude of the random variations being proportional to the magnitude of the physiological signal.

72. The method according to claim 71, wherein said step of measuring at least one physiological activity comprises the step of:

measuring the at least one physiological activity with a physiological signal conditioning system.

73. The method according to claim 72 wherein:

said-step of modulating the magnitude of the effect of the control signals on the ability of the operator to control and interact with at least some of the depicted images, substantially proportionally to the strength of the at least one physiological signal, comprises one of a) or b), comprises a); and said step of modulating the magnitude of the effect of the control signals on the ability of the operator to control and interact with at least some of the depicted images, substantially proportionally to the level of the at least one physiological signal comprises:

utilizing a joystick wired as a voltage divider operatively connected to the physiological signal conditioning system; and configuring and disposing the wired joystick to receive a signal from the physiological signal conditioning system and to convert the signal to a voltage divider wiper signal proportional to both the at least one physiological signal and the joystick position.

74. The method according to claim 73, further comprising the step of varying the digital value registered by the interactive device software, in response to the operator controlled input device signals, by keeping the resistance input to the interactive device set to a constant and varying the voltage input to the interactive device.

75. The method according to claim 74, wherein the interactive device comprises a game port and a computer and wherein said step of varying the digital value registered by the interactive device software, in response to the operator controlled input device signals, by keeping the resistance input to the interactive device set to a constant and varying the voltage, comprises amplifying, offsetting and scaling the wiper signal and creating a nonlinearity to counteract the nonlinearity of the computer game port.

76. The method according to claim 75, wherein the wired joystick comprises at least one button; and said step of modifying the operator's ability comprises controlling the at least one button such that the operator's ability to control the at least one buttons is made contingent on producing criterion values of the at least one physiological signal.

77. The method according to claim 76, wherein said step of measuring at least one physiological activity of the operator to obtain at least one physiological signal having a value indicative of the level of the at least one physiological activity comprises:
   utilizing a baseline deviation deriving system to determine the level of the at least one physiological signal from its deviation from a baseline signal level; and
   wherein the baseline deviation deriving system is operatively connected to the physiological signal conditioning system and to the wired joystick.

78. The method according to claim 77 further comprises wherein:
   the step of displaying the at least one physiological signal having a value indicative of the level of the physiological activity comprises utilizing a signal display system operatively connected to at least one of the baseline deviation deriving system, the physiological signal conditioning system and the at least one button, to permit the displaying of at least one of:
   the at least one physiological signal;
   the base line deviation signal; and
   the criterion values for controlling the buttons.

79. The method according to claim 72, wherein said step of modulating the magnitude of the effect of the control signals on the ability of the operator to control and interact with at least some of the depicted images, substantially proportionally to the strength of the at least one physiological signal, comprises one of a) or b), comprises b).

80. The method according to claim 79, wherein:
   said step of mixing and modulating comprises utilizing at least one of:
   a mixer;
   a voltage controlled amplifier; and
   a voltage controlled filter.

81. The method according to claim 63, wherein the operator controlled input device comprises a game pad, and wherein said step of modifying the operator's ability comprises modifying the operator's control input from the game pad prior to the control input being received by the interactive device.

82. The method according to claim 81, wherein the interactive device comprises software for controlling the displayed images, the control input comprises control signals, and said step of modifying the operator's control input comprises the step of:
   transforming the control signals in response to changes in the at least one physiological signal, prior to the control signals being used by the device software.

83. The method according to claim 82, wherein said step of transforming the control signals comprises modulating the magnitude of the effect of the control signals on the interactive device and, consequently, on the ability of the operator to control and interact with at least some of the depicted images, substantially proportionally to the level of the at least one physiological signal.

84. The method according to claim 83, wherein the game pad comprises buttons, and the buttons comprise at least one of:
   frequency modulated game pad buttons;
   game pad buttons configured to be enabled and disabled; and
   duration modulated game pad buttons.

85. The method according to claim 84 wherein:
   said step of measuring at least one physiological signal comprises utilizing a physiological signal conditioning system; and
   said method includes displaying on a display system at least one of:
   the at least one physiological signal;
   button enable and disable thresholds;
   at least one duration modulation thresholds; and
   at least one motion speed threshold level.

86. The method according to claim 84, wherein the game pad comprises frequency modulated game pad buttons, and wherein said step of transforming the control signals in response to changes in the at least one physiological signal, prior to the control signals being used by the device software comprises:
   utilizing frequency modulation circuitry to produce a stream of pulses, the frequency of which is proportional to the level of the at least one physiological signal;
   utilizing at least one relay; and
   wherein the frequency modulation circuitry and the at least one relay are configured and disposed to alternately enable and disable the game pad buttons at a rate proportional to the frequency of the pulse stream.

87. The method according to claim 84, wherein the game pad comprises game pad buttons configured to be enabled and disabled, and wherein said step of transforming the control signals in response to changes in the at least one physiological signal, prior to the control signals being used by the device software comprises:
   utilizing at least one of:
   threshold detectors; and
   relays; and
   enabling and disabling the game pad buttons, with the threshold detectors and relays, contingent on producing criterion values of the at least one physiological signal.

88. The method according to claim 84, wherein the game pad comprises duration modulated game pad buttons, and wherein said step of transforming the control signals in response to changes in the at least one physiological signal, prior to the control signals being used by the device software comprises:
   utilizing at least one of:
   threshold detectors;
   timers; and
   relays; and
   controlling the length of time a button is enabled by the threshold detectors and timers and relays to be proportional to criterion values of the at least one physiological signal.

89. The method according to claim 86, wherein said step of transforming the control signals in response to changes in the at least one physiological signal, prior to the control signals being used by the device software comprises:
   modulating the amplitude of a randomly varying signal with the at least one physiological signal, and mixing the amplitude modulated randomly varying signal with a DC signal; and transmitting the mixed and modulated signal to be transmitted to the frequency modulation circuitry.

90. The method according to claim 84, wherein the game pad comprises frequency modulated game pad buttons, and wherein said step of transforming the control signals in response to changes in the at least one physiological signal, prior to the control signals being used by the device software comprises:

modulating the duty cycle of the pulses of a periodic signal in response to changes in the at least one physiological signal; and transferring the modulated pulses to the modulated game pad buttons to thus control the functioning of the modulated game pad buttons.

* * * * *